US012547117B2

(12) United States Patent
Kanda et al.

(10) Patent No.: US 12,547,117 B2
(45) Date of Patent: Feb. 10, 2026

(54) IMAGE FORMING SYSTEM

(71) Applicant: CANON FINETECH NISCA INC., Saitama (JP)

(72) Inventors: Koji Kanda, Yamanashi (JP); Yusuke Mitsui, Yamanashi (JP); Toshiyuki Katsumata, Yamanashi (JP)

(73) Assignee: Canon Finetech Nisca Inc., Saitama (JP)

( * ) Notice: Subject to any disclaimer, the term of this patent is extended or adjusted under 35 U.S.C. 154(b) by 0 days.

(21) Appl. No.: 18/901,228

(22) Filed: Sep. 30, 2024

(65) Prior Publication Data

US 2025/0123587 A1 Apr. 17, 2025

(30) Foreign Application Priority Data

Oct. 13, 2023 (JP) ................................ 2023-177919
Oct. 13, 2023 (JP) ................................ 2023-177920
Jul. 31, 2024 (JP) ................................ 2024-124669

(51) Int. Cl.
*G03G 15/00* (2006.01)
*G03G 21/16* (2006.01)

(52) U.S. Cl.
CPC ..... *G03G 21/1652* (2013.01); *G03G 21/1619* (2013.01)

(58) Field of Classification Search
CPC . G03G 15/00; G03G 21/1619; G03G 21/1652
USPC ........................................................... 399/90
See application file for complete search history.

(56) References Cited

U.S. PATENT DOCUMENTS

2011/0135364 A1* 6/2011 Takuwa ............. G03G 15/6552 399/405

FOREIGN PATENT DOCUMENTS

JP 2016114637 A 6/2016
JP 2019215413 * 12/2019
JP 2019220757 * 12/2019

* cited by examiner

*Primary Examiner* — Hoan H Tran
(74) *Attorney, Agent, or Firm* — Venable LLP

(57) ABSTRACT

In an image forming system, a processing unit 120 is provided in an in-body space of an image forming apparatus 1 in a detachably attachable manner, and the image forming apparatus 1 and the processing unit 120 are electrically connected using a drawer connector on a rear side of the in-body space. The processing unit 120 is supported by a movable frame 222 of a slide rail 220, and the movable frame 222 is slidable to be separated from a pair of discharge rollers 20 in a state in which a connector 126 on the processing unit side is disposed on a rear side of the fixed frame 221 and connected to a connector 42 on the image forming apparatus 1 side.

4 Claims, 33 Drawing Sheets

IMAGE FORMING SYSTEM

BACKGROUND OF THE INVENTION

Field of the Invention

The present invention relates to an image forming system including a sheet processing apparatus that performs processing on a sheet discharged from an image forming apparatus.

Description of the Related Art

Conventionally, in an image forming apparatus, there is a configuration in which a sheet processing apparatus that receives a sheet discharged from an apparatus body into an in-body space (a space formed between an image forming portion and a reading portion) and performs various types of processing on the sheet can be mounted. The processing performed by the sheet processing apparatus includes processing such as binding the sheets through stapling, punching holes in the sheets with a punch, or folding the sheets.

When such a sheet processing apparatus is mounted in an in-body space of an image forming apparatus, a service engineer mounts the sheet processing apparatus in a two-step procedure of installation (insertion and fixation into the in-body space) of the sheet processing apparatus and electrical connection between the sheet processing apparatus and the image forming apparatus using a cable (Japanese Patent Application Laid-Open No. 2016-114637).

Therefore, in order to simplify the mounting procedure of the sheet processing apparatus for the service engineer, an image forming apparatus side drawer connector is provided in the in-body space of the image forming apparatus, and a sheet processing apparatus side drawer connector is provided on the sheet processing apparatus side, so that the drawer connectors are fitted to each other through an operation of inserting the sheet processing apparatus into the in-body space, and the image forming apparatus and the sheet processing apparatus can be electrically connected. In this case, the drawer connector is connected once and permanently fixed.

With such a configuration, when a sheet jam occurs between a sheet discharge portion of the image forming apparatus and a sheet receiving portion of the sheet processing apparatus, it is difficult for an end user to perform jam recovery. Therefore, in order to perform jam recovery in a state in which the drawer connectors are connected and fixed to each other, it is required to separate the sheet receiving portion of the sheet processing apparatus from the sheet discharge portion of the image forming apparatus in a sheet conveyance direction.

SUMMARY OF THE INVENTION

According to a representative configuration of the present invention, there is provided an image forming system including an image forming apparatus configured to form an image on a sheet; and a sheet processing apparatus configured to perform predetermined processing on the sheet received from the image forming apparatus, in which the image forming apparatus includes an image forming portion configured to form the image on the sheet, a reading portion disposed above the image forming portion and configured to read an original, a discharge portion configured to discharge the sheet on which the image is formed by the image forming portion in a discharge direction toward an in-body space formed between the image forming portion and the reading portion, and a first drawer connector provided on a wall forming the in-body space, and the sheet processing apparatus includes a processing unit configured to perform predetermined processing on the sheet received from the discharge portion, a second drawer connector fitted to the first drawer connector by inserting the processing unit into the in-body space to electrically connect the image forming apparatus and the processing unit, a fixing portion configured to fix the second drawer connector so as not to come off from the first drawer connector in a state in which the first drawer connector and the second drawer connector are fitted to each other, and a separation mechanism configured to separate the processing unit from the discharge portion in the discharge direction in a state in which the first drawer connector and the second drawer connector are fitted by the fixing portion.

Further features of the present invention will become apparent from the following description of exemplary embodiments with reference to the attached drawings.

DESCRIPTION OF THE EMBODIMENTS

Figure 1:
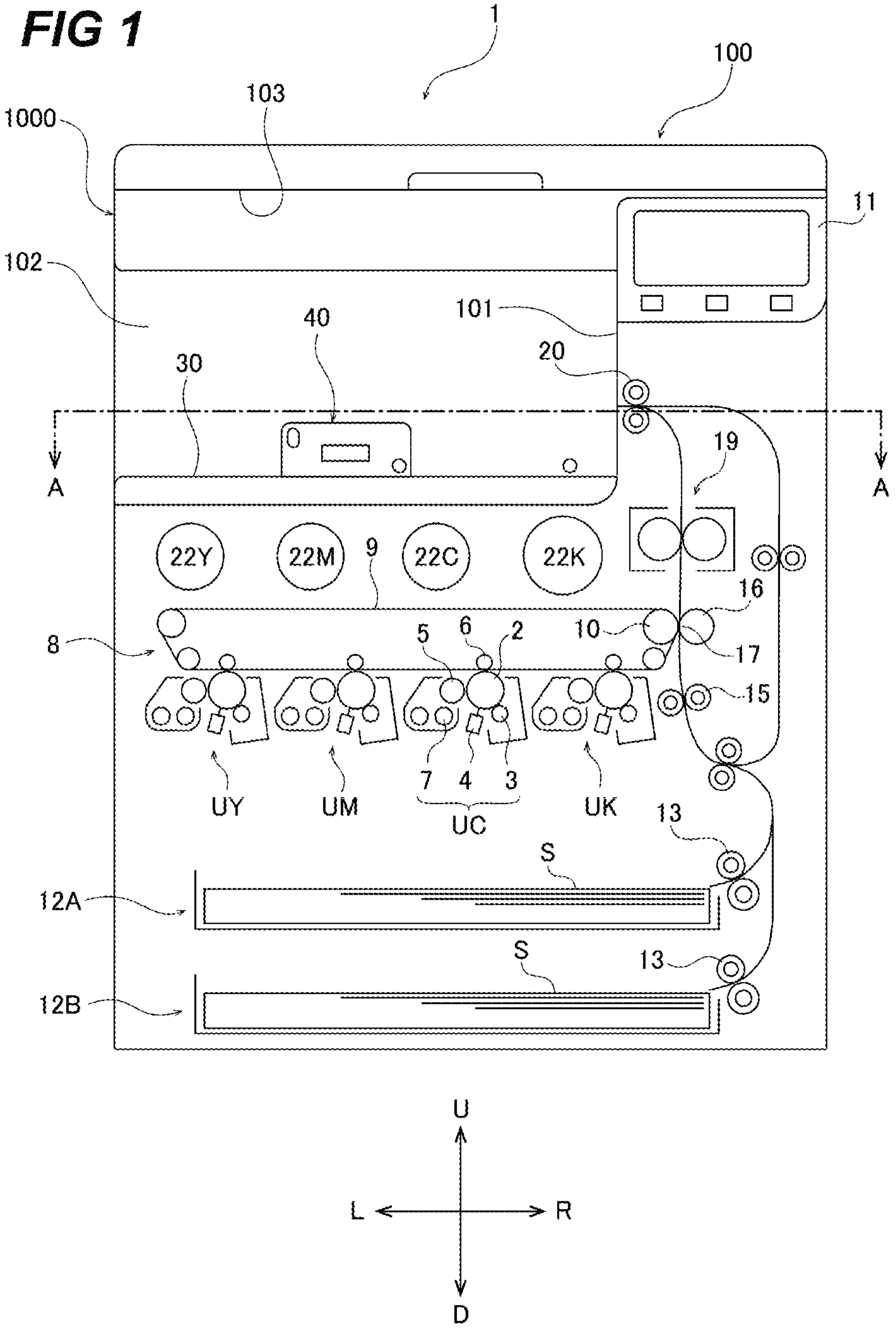
FIG. 1 is a schematic cross-sectional view of an image forming apparatus.

Hereinafter, an embodiment of an image forming apparatus according to the present invention will be specifically described with reference to the drawings. Note that dimensions, materials, relative positions, and the like of each component of the image forming apparatus described below are not limited to the scope of the present invention unless otherwise specified. In addition, components denoted by the same reference numerals in the respective drawings have the same configuration or function, and redundant description thereof will be appropriately omitted.

Figure 10:
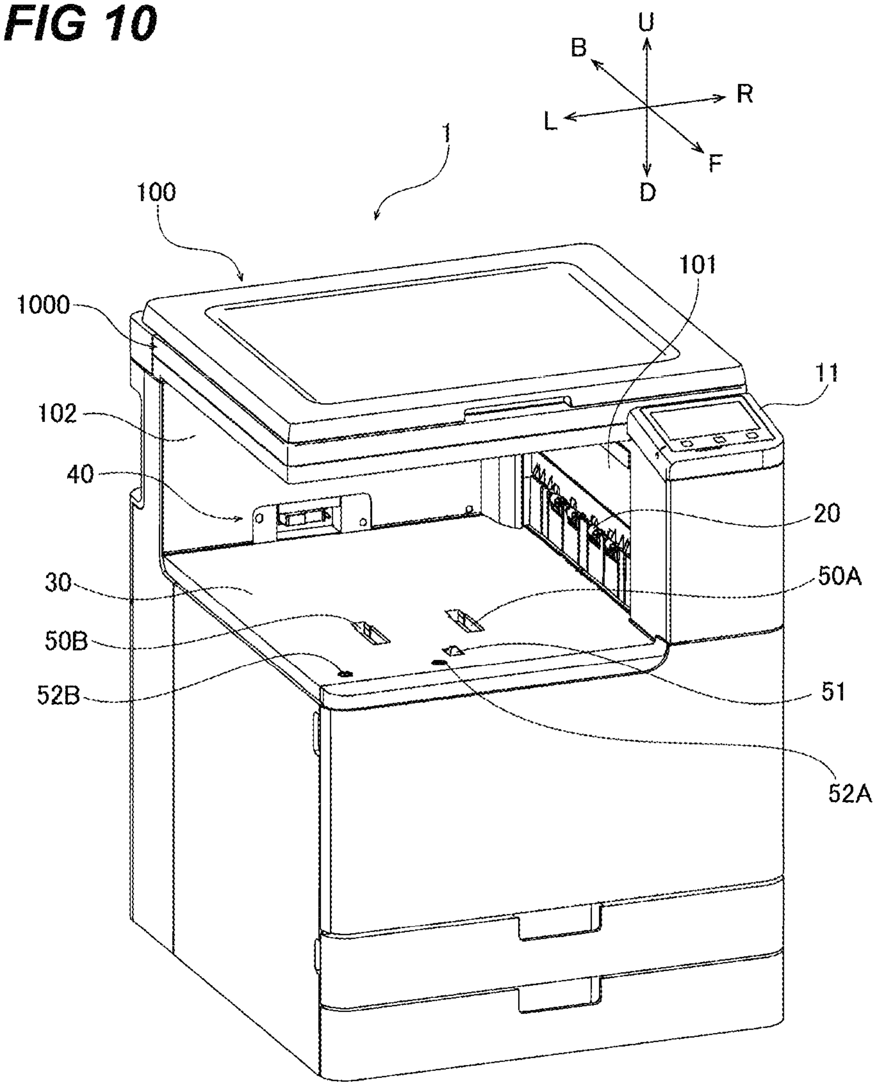
FIG. 10 is a perspective view of the image forming apparatus.

In the following description, an up direction U, a down direction D, a right direction R, a left direction L, a rear direction B, and a front direction F illustrated in FIGS. 1 and 10 are defined as follows. A side on which an operation portion 11 is disposed with respect to an image forming apparatus 1 illustrated in FIGS. 1 and 10 is defined as a front side, and the opposite side is defined as a rear side (an inner side or a back side). In FIG. 1, a direction from the back to the front of the paper will be referred to as a front direction, and a direction from the front to the back of the paper will be referred to as a rear direction. When an image forming unit UK that forms a black image is used as a reference, a side on which an image forming unit UY that forms a yellow image is disposed is defined as a left side. When the image forming unit UY that forms a yellow image is used as a reference, a side on which the image forming unit UK that forms a black image is disposed is defined as a right side. Furthermore, a direction perpendicular to the front-rear direction and the left-right direction defined here and upward in the up-down direction is defined as an up direction, and a direction perpendicular to the front-rear direction and the left-right direction defined here and downward in the up-down direction is defined as a down direction.

In the following description, a first direction will be referred to as a left-right direction, a second direction orthogonal to the first direction will be referred to as a front-rear direction, and a third direction orthogonal to the first direction and the second direction will be referred to as an up-down direction.

(Image Forming Apparatus)

The image forming apparatus 1 will be described with reference to FIG. 1. FIG. 1 is a schematic cross-sectional view of the image forming apparatus 1 according to the present embodiment from the front direction.

The image forming apparatus 1 illustrated in FIG. 1 is a four-color full-color laser printer of a tandem system-intermediate transfer system using an electrophotographic process, and is an example of an image forming apparatus. The image forming apparatus 1 forms a toner image on a sheet S based on image information input from an external host apparatus (not illustrated) such as a personal computer to a control circuit portion (not illustrated).

In an apparatus body 100 which is a main body unit of the image forming apparatus 1, an image forming portion that sequentially forms toner images of four colors including yellow (Y), magenta (M), cyan (C), and black (K) in this order from the left is disposed in a substantially central portion of the apparatus.

The image forming units UY, UM, UC, and UK serving as image forming portions that form toner images of the respective colors have substantially a common configuration. Here, in order to avoid complication of the drawing, each member configuring the cyan image forming unit UC is representatively denoted by a reference numeral, and description of reference numerals of the other members configuring the image forming units UY, UM, and UK is omitted.

Each of the four image forming units UY, UM, UC, and UK includes a drum unit including a rotary drum type electrophotographic photosensitive member (hereinafter, referred to as a photosensitive drum) 2 serving as an image bearing member and a developing unit including a developing sleeve 5 that develops a toner image. Each image forming unit is configured to be replaceable and detachable with respect to the apparatus body 100 which is a body unit of the image forming apparatus 1.

The drum unit includes the photosensitive drum 2, a charging roller 3 that charges the photosensitive drum, and a drum cleaner portion (not illustrated).

In addition to the developing sleeve 5, the developing unit includes a screw 7 that supplies toner to the developing sleeve and stirs the toner.

An LED exposure unit 4 including an LED light emitting element is disposed between the drum unit and the developing unit.

An intermediate transfer belt unit 8 is disposed above the four image forming units UY, UM, UC, and UK. The intermediate transfer belt unit 8 includes four primary transfer rollers 6 and a belt 9 disposed to face the photosensitive drums 2 of the respective colors.

Further, a sheet cassette 12 is disposed below the four image forming units UY, UM, UC, and UK. In the sheet cassette 12, two cassettes such as a cassette 12A disposed in an upper stage and a cassette 12B disposed in a lower stage are disposed.

Further, toner bottles 22Y, 22M, 22C, and 22K are disposed above the intermediate transfer belt unit 8. The toner bottles 22Y, 22M, 22C, and 22K accommodate replenishment toner for the four image forming units UY, UM, UC, and UK, and can be detachably replaced. As a result, an appropriate amount of toner is supplied to the image forming units UY, UM, UC, and UK of the respective colors from the corresponding toner bottles by a toner supply mechanism (not illustrated).

(Image Forming Process)

The image forming process forms a latent image on each of the photosensitive drums 2 of the four image forming units UY, UM, UC, and UK. As the preparation operation, a high voltage is applied to the charging roller 3 pressed against the photosensitive drum 2, and the surface of the charging roller 3 is uniformly charged according to the rotation of the photosensitive drum 2.

Next, a high voltage is applied to the developing sleeve 5 in a path different from the charging roller 3, and the charged toner inside the developing unit is uniformly coated on the surface of the developing sleeve 5. Here, in the inside of the developing unit, the toner is circularly conveyed at a high speed by the screw 7. The rotation speed of the screw 7 is relatively very high compared with a rotation speed of the developing sleeve 5 and the photosensitive drum 2, and coating on the developing sleeve 5 can be uniformly performed without unevenness.

Through light emission and irradiation of the LED of the LED exposure unit 4 disposed between the drum unit and the developing unit, an electrostatic latent image is formed due to a potential change on the surface of the photosensitive drum 2, and the toner of the developing sleeve 5 develops the latent image of the photosensitive drum 2 as a toner image.

The toner image on the photosensitive drum is primarily transferred to the surface of the belt 9 in the order of the above colors according to the rotation of the belt 9 that is an intermediate transfer member. As a result, a toner image in which four colors of Y+M+C+K are superimposed is formed on the belt 9.

A sheet conveyance path configured to convey the sheet S from the bottom to the top is disposed on the right side of the inside of the apparatus body 100 of the image forming apparatus 1. In the sheet conveyance path, a pair of feed rollers 13, a pair of registration rollers 15, a secondary transfer roller 16, a fixing device 19, and a pair of discharge rollers 20 are disposed in this order from the lower side to the upper side. The secondary transfer roller 16 abuts against a belt driving roller 10 on the right side of the intermediate transfer belt unit 8 with a predetermined pressing force via the belt 9 to form a secondary transfer nip portion 17 with the belt 9.

Here, the pair of feed rollers 13 is driven at a predetermined control timing, and the sheets (a recording material or paper) S are separated and fed one by one from the sheet cassette 12 and introduced into the sheet conveyance path. The sheet S is introduced into the secondary transfer nip portion 17 at a predetermined control timing by the pair of registration rollers 15, and is nipped and conveyed. As a result, the toner images of four colors superimposed on the belt 9 are secondarily transferred collectively to the sheet S at the secondary transfer nip portion 17, and an unfixed toner image is formed on the sheet S.

The sheet S that has exited the secondary transfer nip portion 17 is introduced into the fixing device 19 and subjected to a fixing process of the toner image using heat and pressure. The sheet S that has exited the fixing device 19 is discharged as an image formed product by the pair of discharge rollers 20 into the in-body space formed above an in-body lower cover 30 disposed above the toner bottle unit 22. That is, the sheet discharge position is in the in-body space.

Here, the pair of discharge rollers 20 is a discharge portion that is provided in the apparatus body 100 and discharges the sheet S discharged from the apparatus body 100 in the conveyance direction (the left direction in the first direction serving as a discharge direction). The in-body lower cover 30 has an installation surface on which the processing unit is installed. The installation surface of the in-body lower cover 30 and a discharge portion disposition surface 101 on which the pair of discharge rollers 20 is provided form the in-body space in the apparatus body 100. A connector disposition surface 102 on which the main body connection portion 40 is disposed defines the in-body space in a direction (second direction) intersecting the conveyance direction of the sheet S. The in-body space has an opening that is open to the outside. The opening is located on the front side of the image forming apparatus at least in a direction (second direction) intersecting the conveyance direction of the sheet S. There may be openings in other directions (for example, the downstream side in the conveyance direction of the sheet). When the processing unit is attached to the apparatus body 100, the processing unit is inserted into the in-body space from the opening. In addition, the in-body lower cover 30 may form a part of a receiving portion that receives the sheet discharged by the pair of discharge rollers 20.

In the image forming apparatus 1, a reading unit 1000 serving as a reading portion that reads an original is disposed above the image forming portion (UY, UM, UC, UK), and the image forming portion forms an image on a sheet based on image information read by the reading unit 1000. That is, the in-body space is formed between the image forming portion (UY, UM, UC, UK) and the reading unit 1000, and is a space surrounded by the in-body lower cover 30, the discharge portion disposition surface 101 (one of the walls forming the in-body space), the connector disposition surface 102 (one of the walls forming the in-body space), and a lower surface 103 of the reading unit 1000.

(Sheet Processing Apparatus)

Here, a processing unit serving as a sheet processing apparatus that can be attached to the image forming apparatus will be described. The image forming apparatus 1 includes a processing unit that is mounted in the apparatus body 100 in a detachably attachable manner.

The processing unit is inserted into the in-body space of the apparatus body 100 from the opening described above, and is installed on the installation surface of the in-body lower cover 30. The processing unit receives the sheet S discharged by the pair of discharge rollers 20 and performs processing.

In general, a sheet after image formation (or a sheet bundle including a plurality of sheets) may be bound with a staple for each sheet bundle, punched with a punch, or subjected to a sheet folding process such as three-fold or center-fold depending on the intended use. The tendency becomes more remarkable as a user performs image formation using a large amount of sheets.

Therefore, in order to improve the work efficiency and provide high convenience to the user, it is desirable that the image forming apparatus includes a processing unit that automatically performs these processes after discharging a sheet.

The processing unit attached to the apparatus body 100 of the image forming apparatus 1 having the above-described in-body space is roughly divided into two types: an inner finisher attached to the in-body space of the apparatus body 100; and a saddle finisher attached to the side surface of the apparatus body 100.

The inner finisher can be installed in the in-body space of the image forming apparatus, and enables sheet processing while minimizing the installation area of the entire apparatus.

Since the saddle finisher is disposed on the side surface of the image forming apparatus, a predetermined size is required for the installation area, but on the other hand, the saddle finisher can be made larger than the inner finisher, and accordingly, many functions can be mounted.

However, in general, the above-described processing unit is often an optional apparatus attached to the image forming apparatus in response to a user's request. When the processing unit is not attached to the image forming apparatus, a sheet receiving tray is installed on the installation surface of the in-body lower cover 30, or the sheet S is directly discharged onto the installation surface of the in-body lower cover 30. Therefore, it can be said that an image forming apparatus having a configuration in which the processing unit can be mounted even in a form in which the processing unit is not mounted is an aspect of the present embodiment.

Figure 2:
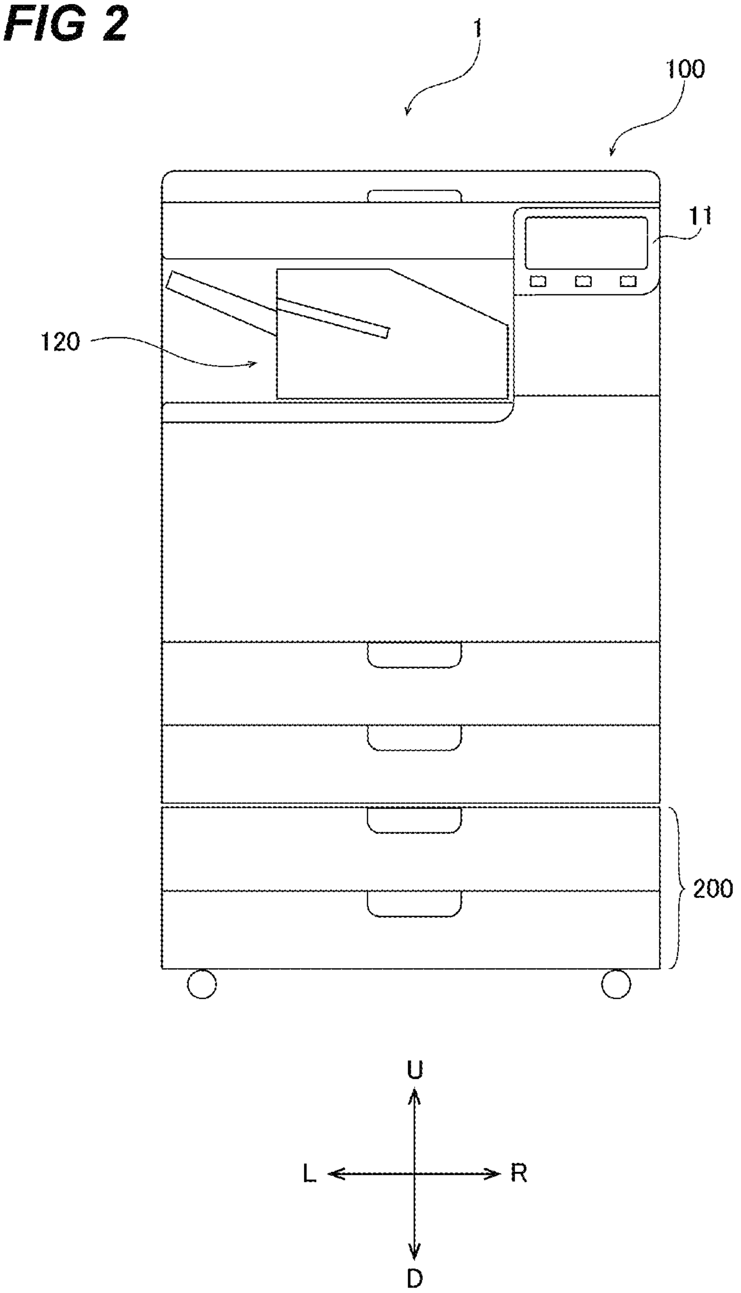
FIG. 2 is a front view of an image forming apparatus and a processing unit.
Figure 3:
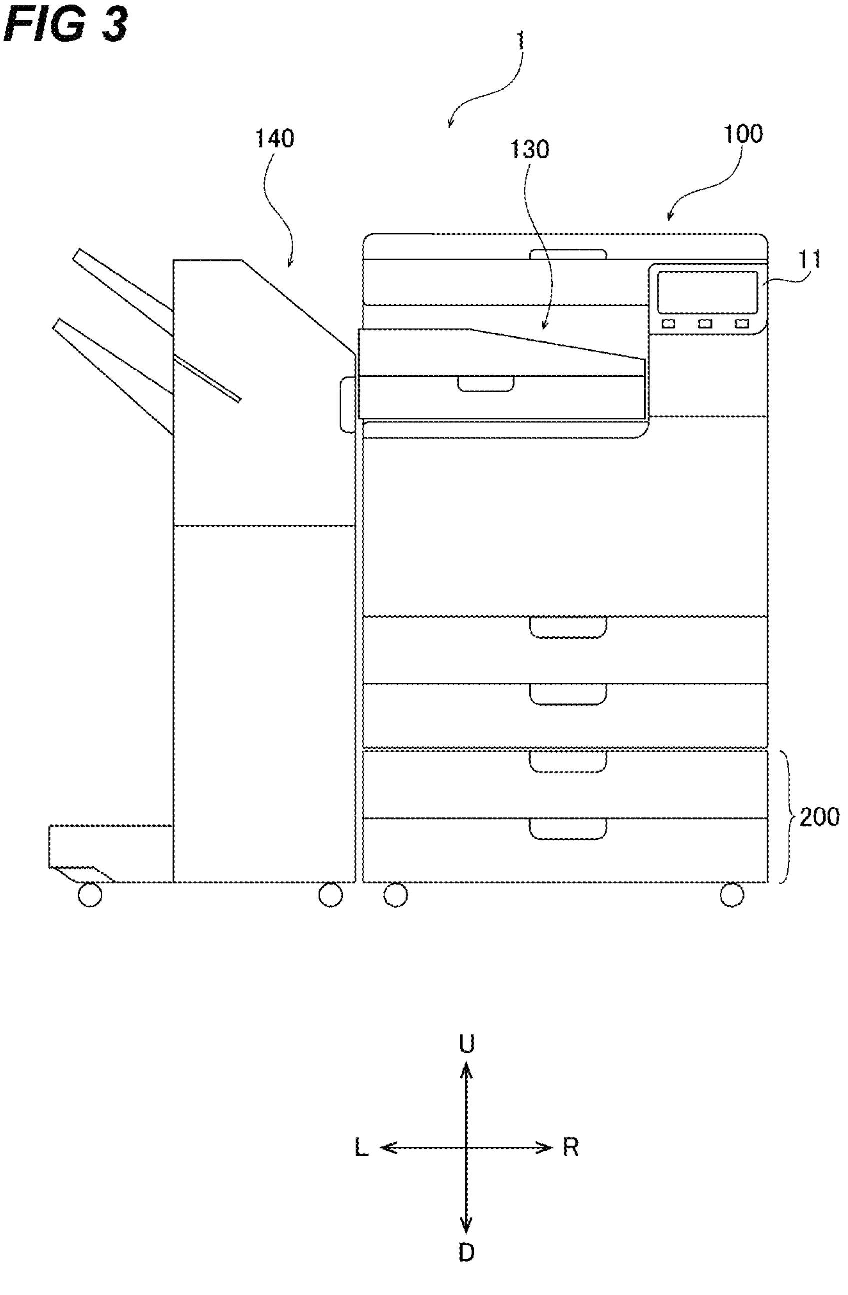
FIG. 3 is a front view of the image forming apparatus and the processing unit.

FIG. 2 illustrates an example of the image forming apparatus 1 in which an inner finisher 120 is mounted in the in-body space on the in-body lower cover 30. FIG. 3 illustrates an example of the image forming apparatus 1 in which a saddle finisher 140 is attached to the side surface.

In the image forming apparatus 1 illustrated in FIG. 2, first, a cassette pedestal 200 that is an optional unit increasing a feed port is connected to the lower surface of the image forming apparatus 1. Further, the inner finisher 120 is connected to the in-body space in the upper portion of the in-body lower cover 30.

As can be seen from FIG. 2, the installation area required for the image forming apparatus 1 does not increase even by the addition of the inner finisher 120, and a processing function can be added in a space-saving manner.

In the image forming apparatus 1 illustrated in FIG. 3, the saddle finisher 140 is disposed on the left surface of the image forming apparatus 1 in which the cassette pedestal 200 is connected to the lower surface. Therefore, there is a distance from the pair of discharge rollers 20 that discharges the sheet to the saddle finisher 140 by the width of the in-body space. Therefore, a buffer path unit 130 that is a conveyance unit that relays and conveys the sheet from the pair of discharge rollers 20 to the saddle finisher 140 that is another unit is disposed in the in-body space.

From the above description, it can be said that the buffer path unit 130 is also one of the processing units similarly to the inner finisher 120.

(Connection Configuration of Processing Unit)

Here, in processing units such as the inner finisher 120 and the buffer path unit 130, sheet conveyance and various processes are controlled by using control signals from the image forming apparatus side. Therefore, a processing unit requires an electrical connection unit that transmits a control signal from the apparatus body of the image forming apparatus.

In many of processing units connected to the image forming apparatus, a cable including a connector at a distal end is disposed at a position accessible and easily visible by an installer. Therefore, after a processing unit is fixed to the image forming apparatus, the processing unit is electrically connected to the apparatus body by performing a two-step procedure of manually connecting a connector on the processing unit side to a connector on the image forming apparatus side.

On the other hand, in the present embodiment, in order to simplify the mounting procedure of the processing unit and shorten the installation time, the electrical connection for transmitting the control signal from the apparatus body is made by a drawer connector not illustrated in FIG. 2.

Figure 4:
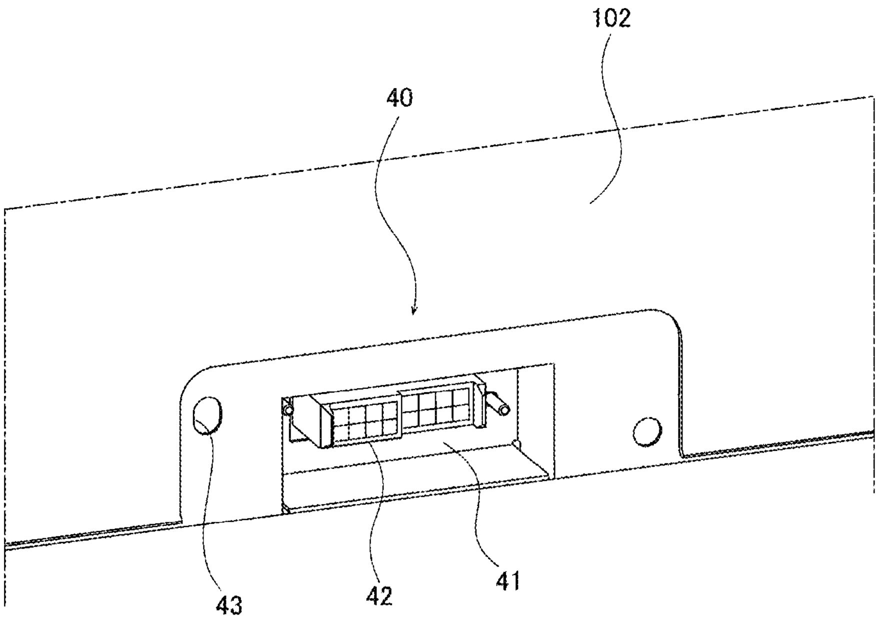
FIG. 4 is a partially enlarged perspective view of the image forming apparatus.
Figure 5A:
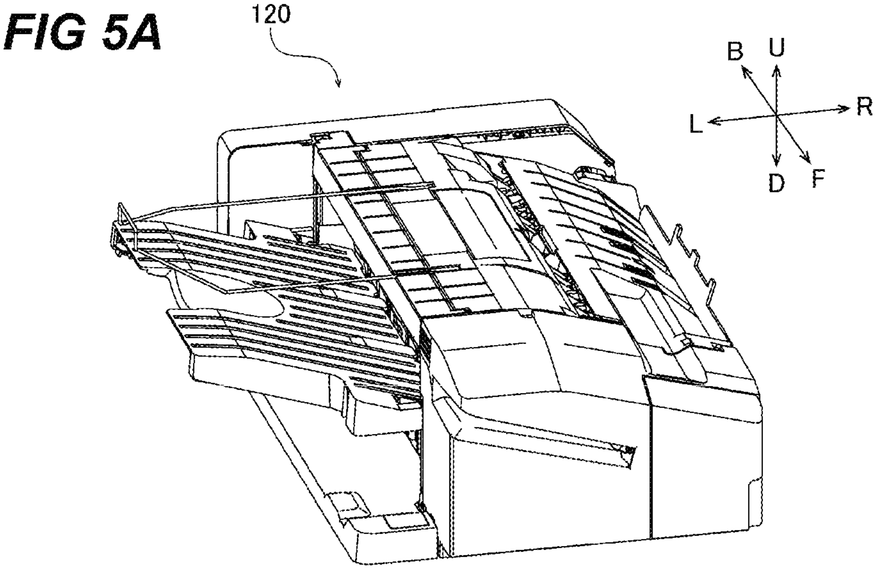
FIGS. 5A and 5B are perspective views of the processing unit.
Figure 5B:
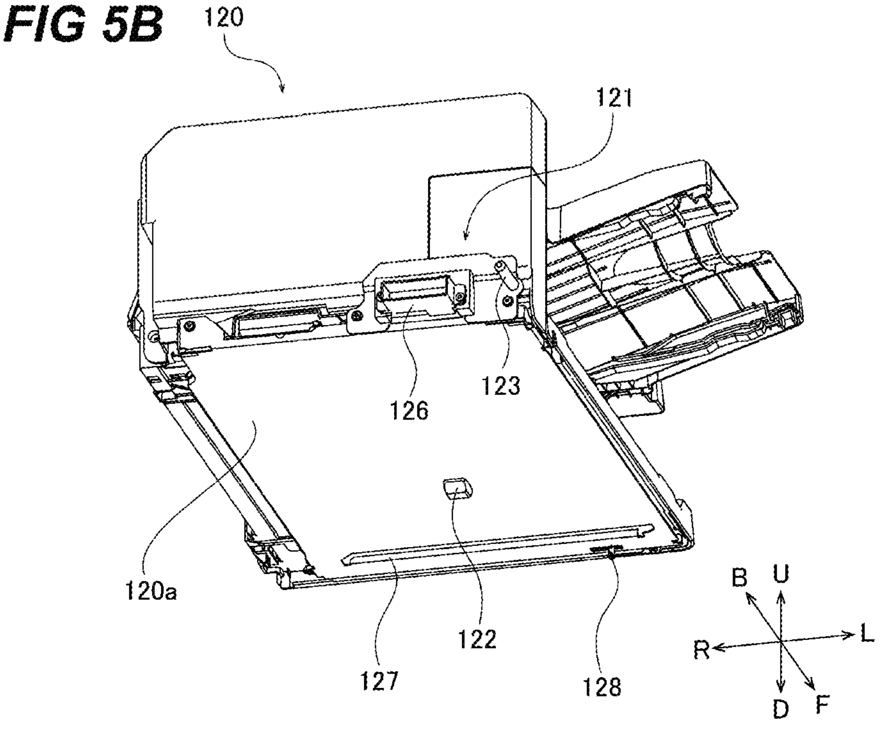
Figure 6:
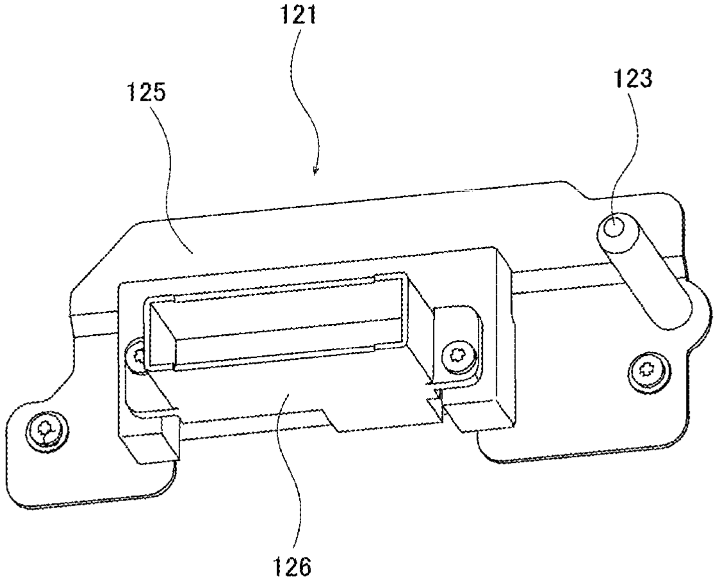
FIG. 6 is a partially enlarged perspective view of the processing unit.

The disposition of the drawer connector will be described below with reference to FIGS. 1, 4, 5A, 5B, and 6. FIG. 4 is an enlarged perspective view of a main body connection portion 40 on the image forming apparatus side. FIGS. 5A and 5B are perspective views of the inner finisher 120 in a single body state, FIG. 5A is a perspective view of the inner finisher 120 when viewed from above on the front side, and FIG. 5B is a perspective view of the inner finisher 120 when viewed from below on the back side. FIG. 6 is an enlarged perspective view of a unit connection portion 121 of the inner finisher 120.

The drawer connector includes a pair of male and female connectors, and includes a drawer connector (first connector) 126 included in the unit connection portion 121 on the inner finisher 120 side and a drawer connector (second connector) 42 included in the main body connection portion 40 on the image forming apparatus 1 side.

As illustrated in FIGS. 1 and 4, the main body connection portion 40 on the image forming apparatus 1 side is provided substantially at the center of the connector installation surface on the rear side in the front-rear direction of the in-body space. The main body connection portion 40 is installed on the rear side in the front-rear direction (second direction) with respect to the in-body lower cover 30 (see FIG. 7). In other words, the main body connection portion 40 is disposed on one side in the direction (second direction) intersecting the sheet discharge direction with respect to the position (sheet discharge position) of the sheet discharged from the discharge portion (pair of discharge rollers 20). The drawer connector (second connector) 42 on the image forming apparatus 1 side is disposed substantially at the center of a drawer holding plate 41 forming a rear surface in the front-rear direction of the in-body space in the main body connection portion 40.

As illustrated in FIG. 5B, the unit connection portion 121 on the inner finisher 120 side is provided on the distal end side with respect to the insertion in the rear direction B of the front-rear direction. The drawer connector (first connector) 126 on the inner finisher 120 side is disposed at the center of the unit drawer holding plate 125 in the unit connection portion 121. When the inner finisher 120 is installed, the drawer connector 126 on the inner finisher 120 side is inserted into the drawer connector 42 on the image forming apparatus 1 side in the direction (second direction) intersecting the sheet discharge direction. As described above, the drawer connector 126 on the inner finisher 120 side and the drawer connector 42 on the image forming apparatus 1 side are engaged with each other, and thus the inner finisher 120 and the apparatus body 100 are electrically connected.

The drawer connector 42 on the apparatus body 100 side includes a rectangular tube-shaped housing, and a terminal group electrically connected to the inner finisher 120 is disposed inside the housing.

Similarly, the drawer connector 126 on the unit side includes a rectangular tube-shaped housing, and a terminal group electrically connected to the apparatus body 100 is disposed inside the housing.

With the above configuration, when the inner finisher 120 is mounted in the in-body space of the image forming apparatus 1, the drawer connector 126 is located on the distal end side in the unit insertion direction, and is fitted to the drawer connector 42 on the main body side only by the procedure of the unit mounting operation, and electrical connection can be easily performed.

Although the example of the drawer connector on the processing unit side has been described by exemplifying the case where the processing unit is the inner finisher 120, the same applies to a case where the processing unit is an inner folding machine or an inner puncher. That is, a configuration of a unit connection portion and a disposition of the unit connection portion included in the inner folding machine or the inner puncher are the same as those of the inner finisher 120.

(Positioning Configuration of Processing Unit/Left-Right Direction)

Here, a positioning configuration of the processing unit in the left-right direction with respect to the image forming apparatus 1 will be described.

As illustrated in FIGS. 5B and 6, the inner finisher 120 includes a positioning shaft 123 serving as a second positioning portion that is positioned by being engaged with the apparatus body 100 of the image forming apparatus 1. The positioning shaft 123 is disposed on the distal end side with respect to the insertion in the rear direction B of the front-rear direction in the inner finisher 120. The positioning shaft 123 is disposed near the drawer connector 126 in the unit connection portion 121.

As illustrated in FIG. 4, the apparatus body 100 of the image forming apparatus 1 includes a positioning hole 43 serving as an engagement hole to be engaged with the positioning shaft 123. The positioning hole 43 is disposed on the rear surface of the in-body space in the front-rear direction in the apparatus body 100. The positioning hole 43 is disposed further toward the rear side than the in-body lower cover 30 in the front-rear direction.

The positioning shaft 123 on the unit connection portion 121 side is disposed to be fitted to the positioning hole 43 on the main body connection portion 40 side. As illustrated in FIG. 6, the positioning shaft 123 is a columnar shaft member extending in the front-rear direction with respect to the drawer connector 126. A length of the positioning shaft 123 in the front-rear direction is adjusted and determined such that the positioning shaft 123 is engaged with the positioning hole 43 before the drawer connector 126 on the inner finisher 120 side is engaged with the drawer connector 42 on the apparatus body 100 side. When the inner finisher 120 is installed, as the inner finisher 120 moves relative to the apparatus body 100, the state changes from (1) a state in which the positioning shaft 123 is separated from the positioning hole 43 and the drawer connector 126 on the inner finisher 120 side is separated from the drawer connector 42 on the apparatus body 100 side to (2) a state in which the positioning shaft 123 is inserted into the positioning hole 43 and the drawer connector 126 on the inner finisher 120 side is separated from the drawer connector 42 on the apparatus body 100 side. Thereafter, the state changes to (3) a state in which the positioning shaft 123 is inserted into the positioning hole 43 and the drawer connector 126 on the inner finisher 120 side and the drawer connector 42 on the apparatus body 100 side are connected.

As described above, the positioning shaft 123 on the processing unit side is first fitted to the positioning hole 43 on the apparatus body side, so that the positions of the drawer connector 126 on the processing unit side and the drawer connector 42 on the apparatus body side face each other to be fitted without the pair of connectors getting on.

Figure 7:
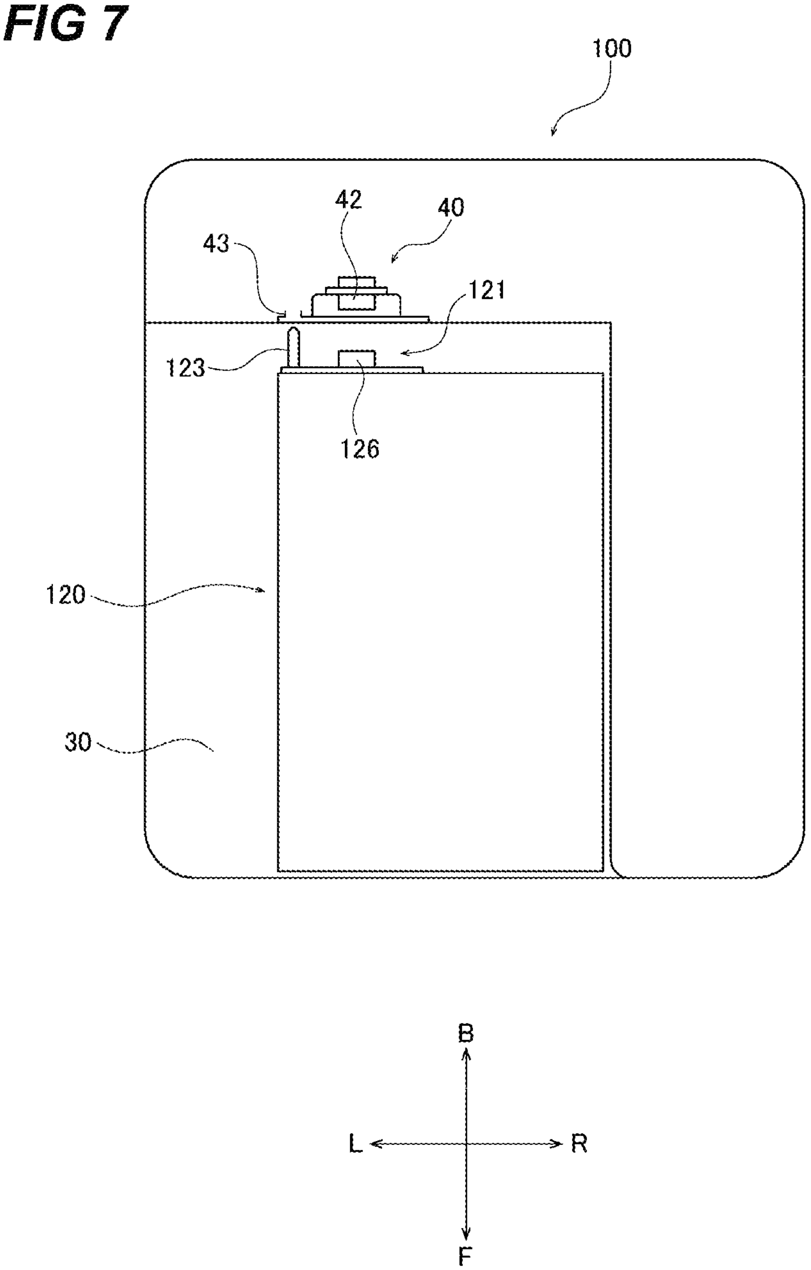
FIG. 7 is a cross-sectional view of the image forming apparatus and the processing unit.
Figure 8:
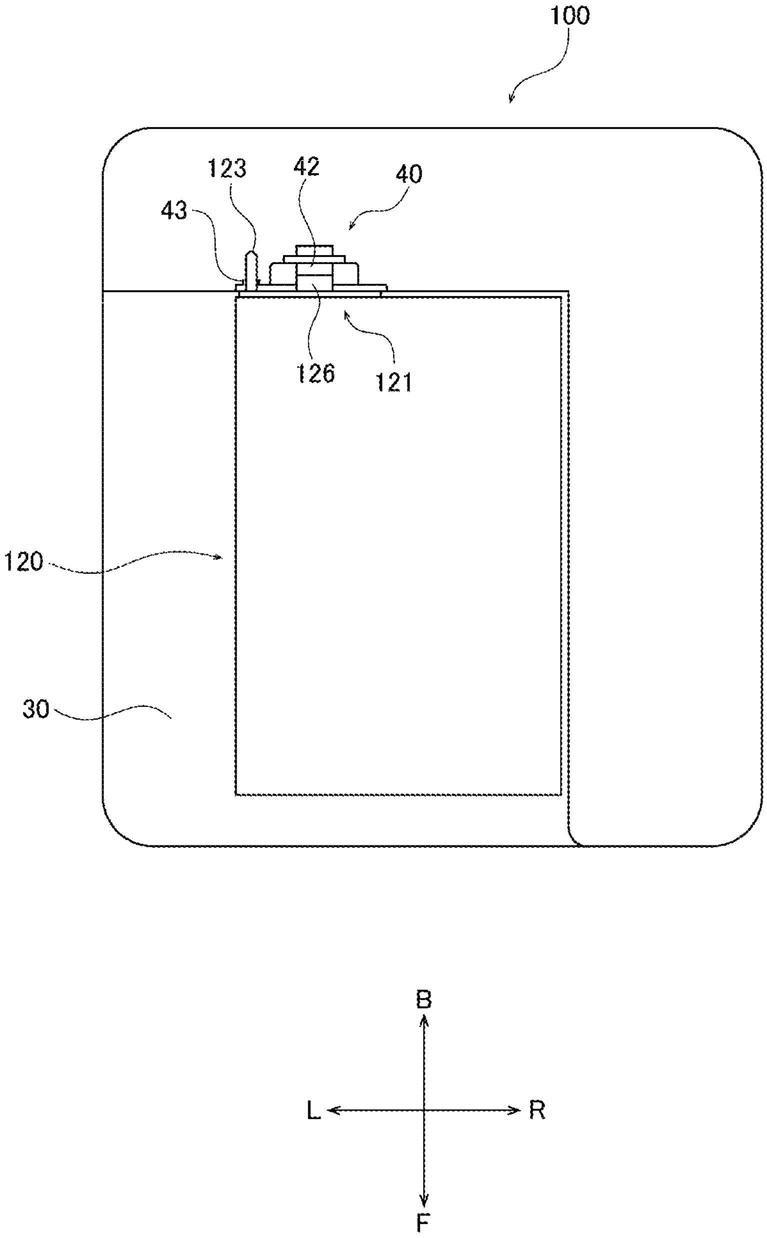
FIG. 8 is a cross-sectional view of the image forming apparatus and the processing unit.
Figure 9:
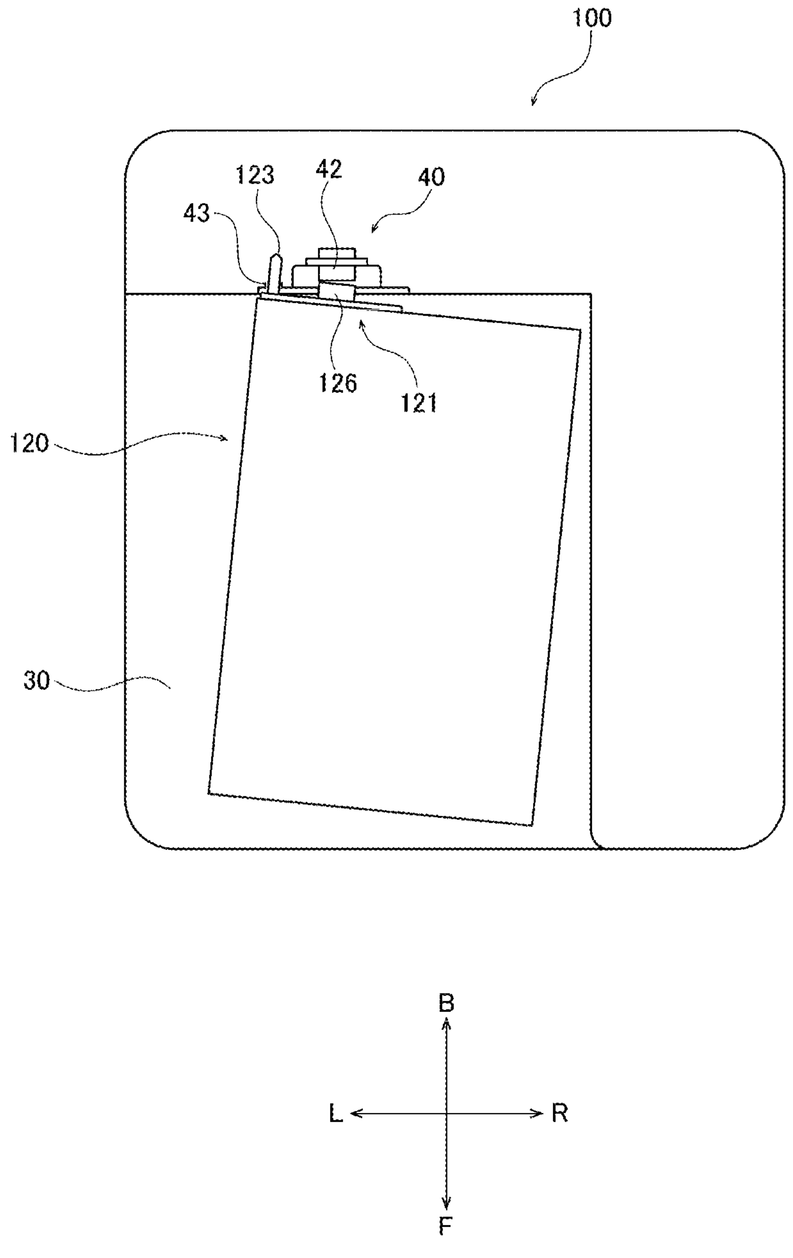
FIG. 9 is a cross-sectional view of the image forming apparatus and the processing unit.

The fitting between the positioning shaft 123 on the processing unit side and the positioning hole 43 on the apparatus body side and the fitting between the drawer connector 126 on the processing unit side and the drawer connector 42 on the apparatus body side will be described with reference to FIGS. 7, 8, and 9. FIGS. 7, 8, and 9 are cross-sectional views of the image forming apparatus and the processing unit taken along line A-A illustrated in FIG. 1.

FIG. 7 illustrates a state immediately before the positioning shaft 123 of the inner finisher 120 is fitted to the positioning hole 43 on the apparatus body side. FIG. 8 illustrates a state in which the drawer connector 126 on the processing unit side and the drawer connector 42 on the apparatus body side are fitted to each other after the positioning shaft 123 is fitted to the positioning hole 43.

It can be seen from FIGS. 7 and 8 that the positioning shaft 123 on the processing unit side and the positioning hole 43 on the apparatus body side are fitted before the pair of drawer connectors (42, 126) starts to be fitted.

This reduces a risk that the pair of drawer connectors (42, 126) gets on without fitting when the processing unit is mounted and the connectors are not appropriately connected.

Here, a configuration that facilitates connection of the connectors by being adopted in combination with or in place of the fitting configuration of the positioning shaft 123 and the positioning hole 43 will be described.

For example, as illustrated in FIG. 9, even in a state in which the positioning shaft 123 is fitted to the positioning hole 43, it is conceivable that the front surface side of the inner finisher 120 is inclined leftward with respect to the rear surface in the in-body space of the apparatus body 100.

This is because the outer diameter of the positioning shaft 123 has a predetermined clearance with respect to the inner diameter of the positioning hole 43. Due to this predetermined clearance, the positioning shaft 123 on the processing unit side is fitted to the positioning hole 43 on the apparatus body 100 side, and at the same time, smoothly slides in the rear direction of the front-rear direction. On the other hand, when the positioning shaft 123 is inclined with respect to the positioning hole 43 within the predetermined clearance range, the state illustrated in FIG. 9 is obtained.

In this case, as can be seen from FIG. 9, one of the pair of drawer connectors 42 and 126 may be inclined in the left-right direction with respect to the other, and the pair of drawer connectors (42, 126) may not be appropriately fitted.

In contrast, in the present embodiment, by adding a positioning configuration in the left-right direction as a configuration different from the positioning shaft 123, connection of the pair of drawer connectors (42, 126) is further facilitated. Although an additional configuration is described here, as described above, the positioning configuration described below may be adopted, and the fitting configuration of the positioning shaft 123 and the positioning hole 43 may be deleted.

Hereinafter, a positioning configuration in the left-right direction will be described with reference to FIGS. 5A, 5B and 10 to 13. Conventionally, in order to reliably fit a pair of drawer connectors, it is necessary to provide a rail that restricts the up-down direction and the left-right direction with respect to the insertion direction of the drawer connector in the in-body space. However, in the present embodiment, since a service engineer performs fitting of the drawer connectors, fitting of the drawer connectors is supported only by restricting the left-right direction with respect to the insertion direction of the drawer connectors by using a simple positioning configuration described below. Therefore, in the image forming system of the present embodiment, an expensive rail that fits the drawer connectors is not required, and the processing unit can be quickly mounted in the in-body space of the image forming apparatus with an inexpensive configuration compared with the conventional cable connection.

Figure 11:
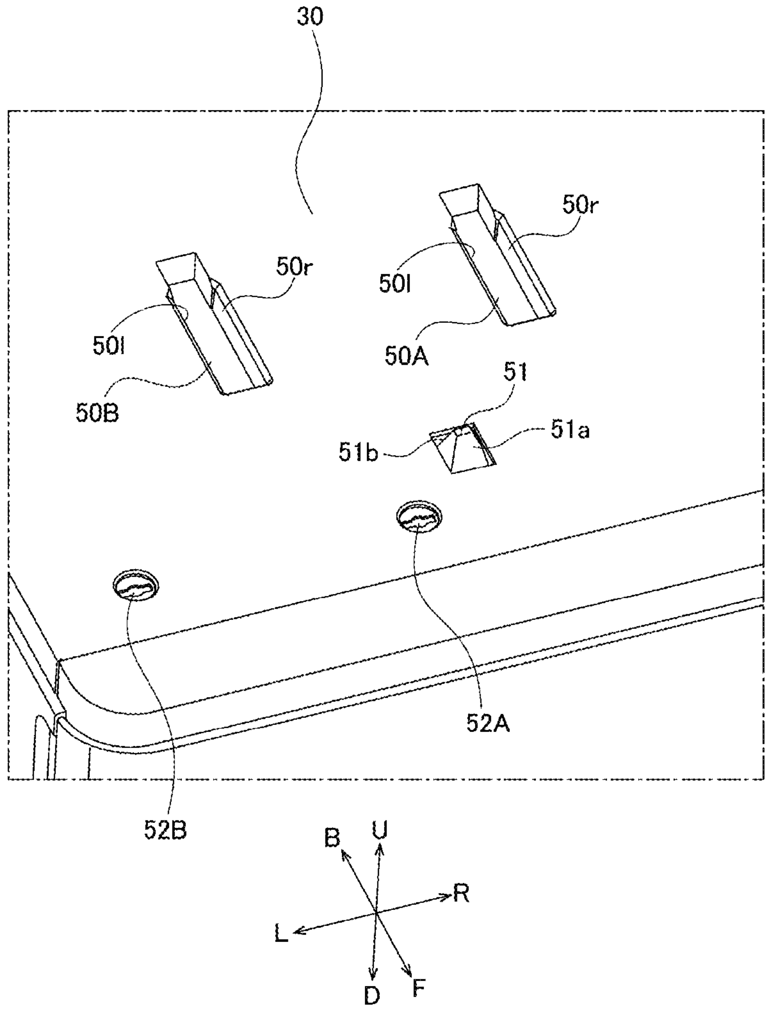
FIG. 11 is a partially enlarged perspective view of the image forming apparatus.
Figure 12:
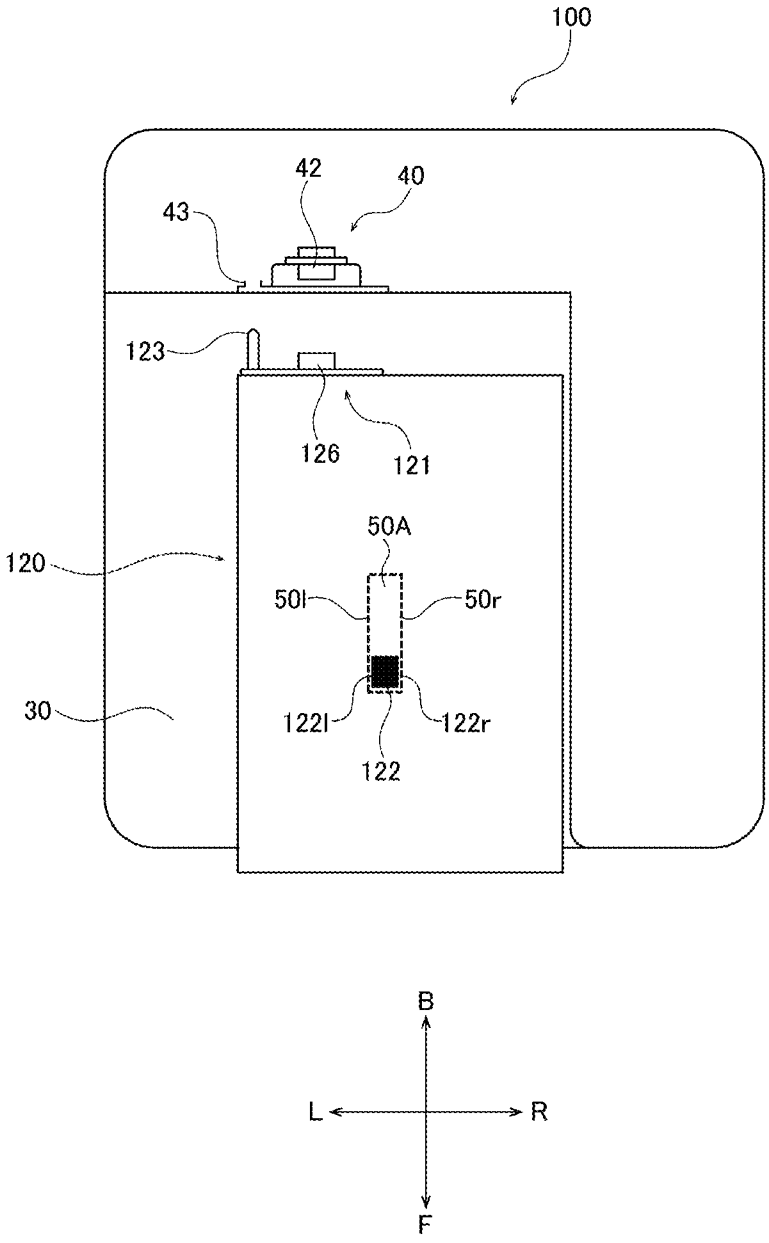
FIG. 12 is a cross-sectional view of the image forming apparatus and the processing unit.
Figure 13:
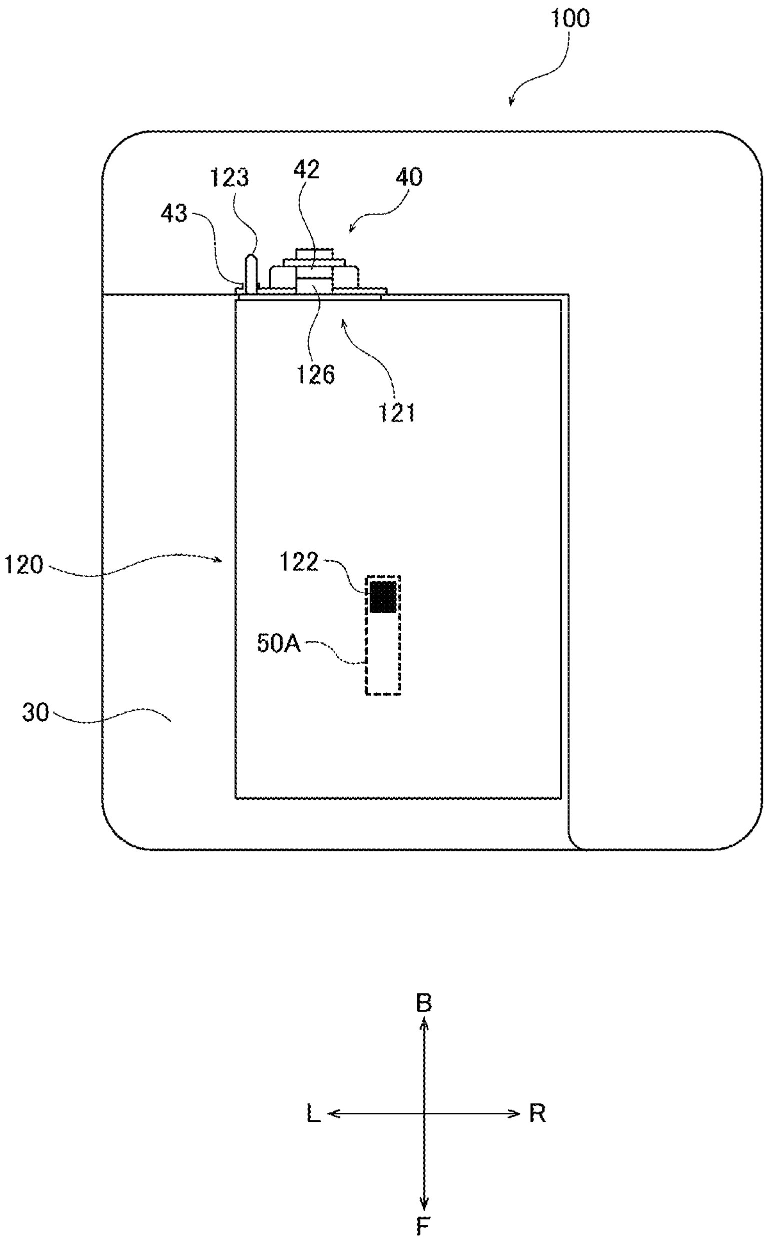
FIG. 13 is a cross-sectional view of the image forming apparatus and the processing unit.

FIG. 10 is a perspective view of the in-body space of the image forming apparatus 1. FIG. 11 is a partially enlarged perspective view of the image forming apparatus, and specifically, is a partially enlarged perspective view of the in-body lower cover 30. FIGS. 12 and 13 are cross-sectional views of the image forming apparatus and the processing unit taken along line A-A illustrated in FIG. 1.

As illustrated in FIG. 5B, the inner finisher 120 that is a processing unit includes a protrusion 122 that is a first positioning portion. The protrusion 122 is engaged with the apparatus body 100 of the image forming apparatus 1 to be movable in the front-rear direction (second direction), and is restricted from moving in the left-right direction (first direction). The protrusion 122 is provided on a lower surface 120*a* of the inner finisher 120, and is formed to protrude downward from the lower surface 120*a*. In other words, the protrusion 122 is provided to protrude from the lower surface 120*a* of the inner finisher 120 toward the in-body lower cover 30.

On the other hand, as illustrated in FIGS. 10 and 11, the apparatus body 100 of the image forming apparatus 1 includes a groove 50A and a groove 50B. Each of the groove 50A and the groove 50B is engageable with the protrusion 122 to allow movement of the protrusion 122 in the front-rear direction (second direction). In addition, each of the groove 50A and the groove 50B restricts the movement of the engaged protrusion 122 in the left-right direction (first direction). The groove 50A and the groove 50B are provided in the in-body lower cover 30. The groove 50A and the groove 50B are formed to be recessed in the up-down direction (third direction) in the in-body lower cover 30.

When the protrusion 122 is engaged with one of the groove 50A and the groove 50B, a movable range in the left-right direction (first direction) and a movable range in the front-rear direction (second direction) of the inner finisher 120 with respect to the apparatus body 100 are defined. The movable range in the first direction and the movable range in the second direction are defined by dimensions of the protrusion 122, the groove 50A, and the groove 50B in corresponding directions. By limiting the movable range in the left-right direction (first direction), the drawer connector 126 on the inner finisher 120 side is guided to a position to be fitted to the drawer connector 42 on the apparatus body 100 side. As a result, even if the pair of drawer connectors (42, 126) cannot be visually recognized, the pair of drawer connectors (42, 126) can be easily connected.

When the inner finisher 120 is installed in the apparatus body 100, first, the protrusion 122 of the inner finisher 120 is fitted to one of the groove 50A and the groove 50B. In this case, the drawer connector 126 on the inner finisher 120 side is separated from the drawer connector 42 on the apparatus body 100 side. In a case where the positioning shaft 123 and the positioning hole 43 are provided, the positioning shaft 123 is separated from the positioning hole 43. In this state, the inner finisher 120 is movable relative to the apparatus body 100 in the direction (second direction) intersecting the sheet discharge direction. On the other hand, in the sheet discharge direction (first direction), the movement range of the inner finisher 120 is restricted to a range narrower than the movable range in the second direction.

For a direction (second direction) intersecting the sheet discharge direction, a movable range is determined so that at least the drawer connector 126 on the inner finisher 120 side and the drawer connector 42 on the apparatus body 100 side can take a state of being separated from each other and a state of being fitted to each other. One end (rear side) of the movable range in the second direction may be substantially defined by the pair of drawer connectors (42, 126) in a fitted state. The other end (front side) of the movable range in the second direction may be defined by the end of the groove 50A (or the groove 50B). Alternatively, since the front side of the groove 50A (or the groove 50B) is released, the front side of the movable range in the second direction may be defined as a position where the inner finisher 120 is substantially separated from the apparatus body 100.

The movable range in the left-right direction (first direction) will be described. The movable range in the left-right direction may include at least a position where the pair of drawer connectors (42, 126) is fitted to each other. The inner finisher 120 may be configured not to move at all in the left-right direction with respect to the apparatus body 100 in a state in which the protrusion 122 is fitted to the groove 50A (or the groove 50B). However, in such a design, there is a possibility that the protrusion 122 cannot be fitted to the groove 50A (or the groove 50B) due to a manufacturing error. Therefore, in consideration of such a manufacturing error, the width of the groove 50A (or the groove 50B) in the first direction may be made larger than the width of the protrusion 122 in the first direction.

Further, both the groove 50A and the groove 50B are grooves formed to extend in the front-rear direction of the image forming apparatus, and the groove width in the left-right direction may be larger on the front side than that of the innermost portion. As a result, the protrusion 122 of the inner finisher 120 is easily engaged with the front side of the groove 50A (or the groove 50B), and the operability is improved. In this case, as the groove width in the left-right direction becomes larger, it is possible to improve the operability. In the state immediately before the pair of drawer connectors (42, 126) is fitted to the inner finisher 120, the movable range in the left-right direction (first direction) may be narrower than the movable range in the front-rear direction (second direction). Therefore, for example, in order to improve operability, in some states, the movable range in the left-right direction (first direction) may be wider than the movable range in the front-rear direction (second direction).

In addition, as illustrated in FIG. 11, the groove 50A has a left wall surface (first wall surface) 501 and a right wall surface (second wall surface) 50*r* that extend in the front-rear direction (second direction) and face each other in the left-right direction (first direction). Similarly, the groove 50B has a left wall surface (first wall surface) 501 and a right wall surface (second wall surface) 50*r* that extend in the front-rear direction (second direction) and face each other in the left-right direction (first direction).

On the other hand, as illustrated in FIG. 12, the protrusion 122 has a left side surface (first side surface) 1221 and a right side surface (second side surface) 122*r* facing each other in the left-right direction (first direction). In a state in which the protrusion 122 is fitted to the groove 50A (or the groove 50B), the left side surface (first side surface) 1221 faces the left wall surface 501 of the groove 50A (or the groove 50B). In a state in which the protrusion 122 is fitted to the groove 50A (or the groove 50B), the right side surface (second side surface) 122*r* faces the right wall surface 50*r* of the groove 50A (or the groove 50B).

By configuring the protrusion 122, the groove 50A, and the groove 50B as described above, it is possible to restrict to some extent the inner finisher 120 from rotating on the in-body lower cover 30 of the image forming apparatus 1 about the protrusion 122.

As illustrated in FIG. 12, the protrusion 122 on the lower surface 120*a* of the inner finisher 120 is in a positional relationship of being fitted to the front side of the groove 50A indicated by a dashed line before the positioning shaft 123 of the inner finisher 120 is engaged with the positioning hole 43 on the apparatus body 100 side. In this case, since the groove width of the front side of the groove 50A in the left-right direction is slightly larger than the width of the protrusion 122 in the left-right direction, the protrusion 122 and the groove 50A are easily engaged with each other. Although there is room for positional deviation of the inner finisher 120 in the left-right direction, the positional deviation is extremely small with respect to the inclination of the inner finisher 120 and can be sufficiently ignored.

By inserting the inner finisher 120 toward the rear side of the in-body space from the state illustrated in FIG. 12, the positioning shaft 123 is fitted to the positioning hole 43 as illustrated in FIG. 13, and then the drawer connector 126 is fitted to the drawer connector 42. In this case, the protrusion 122 is in a state of being fitted to the innermost portion of the groove 50A, and there is almost no room for positional deviation in the left-right direction.

As illustrated in FIG. 13, in a state in which the protrusion 122 and the innermost portion of the groove 50A are fitted to each other and the positioning shaft 123 and the positioning hole 43 are fitted to each other, it is impossible to incline the inner finisher 120 in the left-right direction as illustrated in FIG. 9. Therefore, the drawer connector 126 on the processing unit side and the drawer connector 42 on the apparatus body 100 side can be easily fitted, the electrical connection between the processing unit and the apparatus body 100 is reliably made, and the risk of connection failure or breakage of the drawer connectors can be reduced.

Similarly to the inner finisher 120, the buffer path unit 130 also has a unit connection portion 121 and a protrusion 122. Therefore, since the protrusion 122 on the lower surface of the buffer path unit 130 is fitted to the groove 50A on the apparatus body 100 side, restriction in the left-right direction is performed, and a similar effect can be obtained.

(Positioning Configuration of Processing Unit/Front-Rear Direction)

As described above, the positioning configuration of the processing unit in the left-right direction with respect to the image forming apparatus 1 has been described, but positioning of the processing unit is not limited thereto, and the positioning configuration of the unit in the front-rear direction (insertion direction) is also provided.

Figure 14:
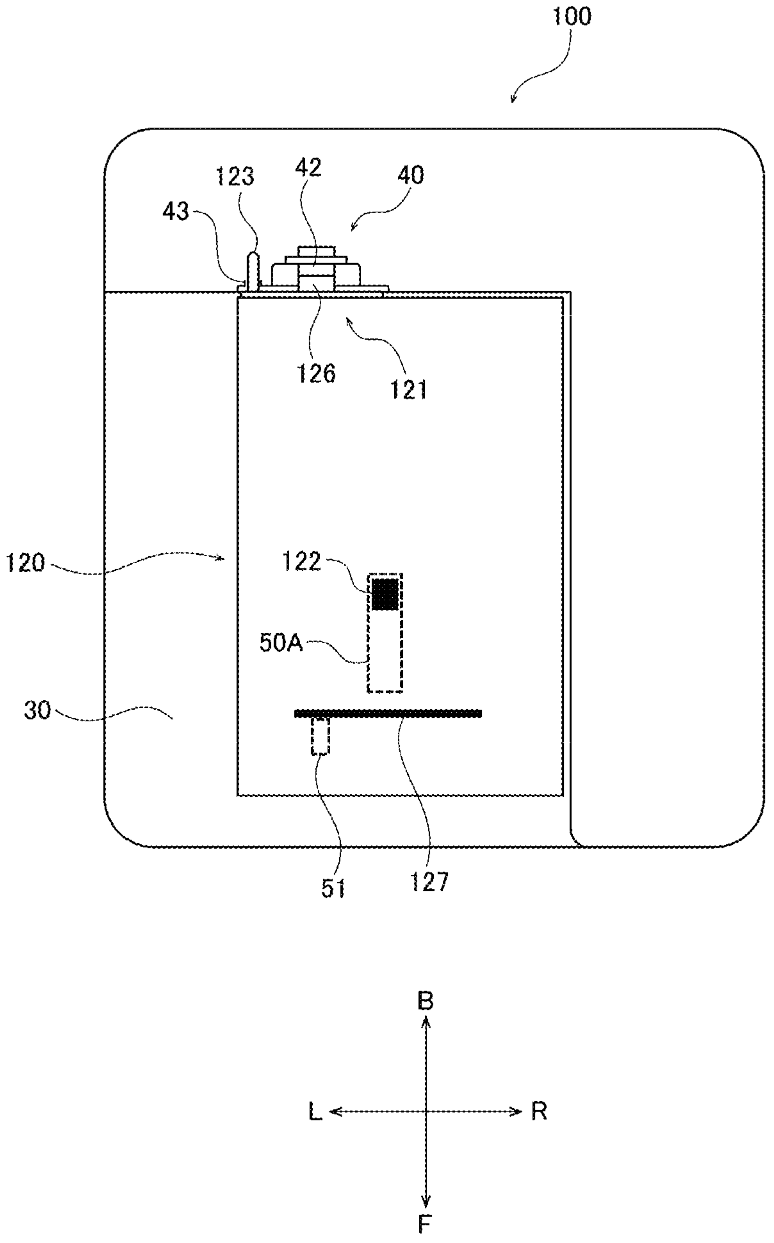
FIG. 14 is a cross-sectional view of the image forming apparatus and the processing unit.
Figure 15A:
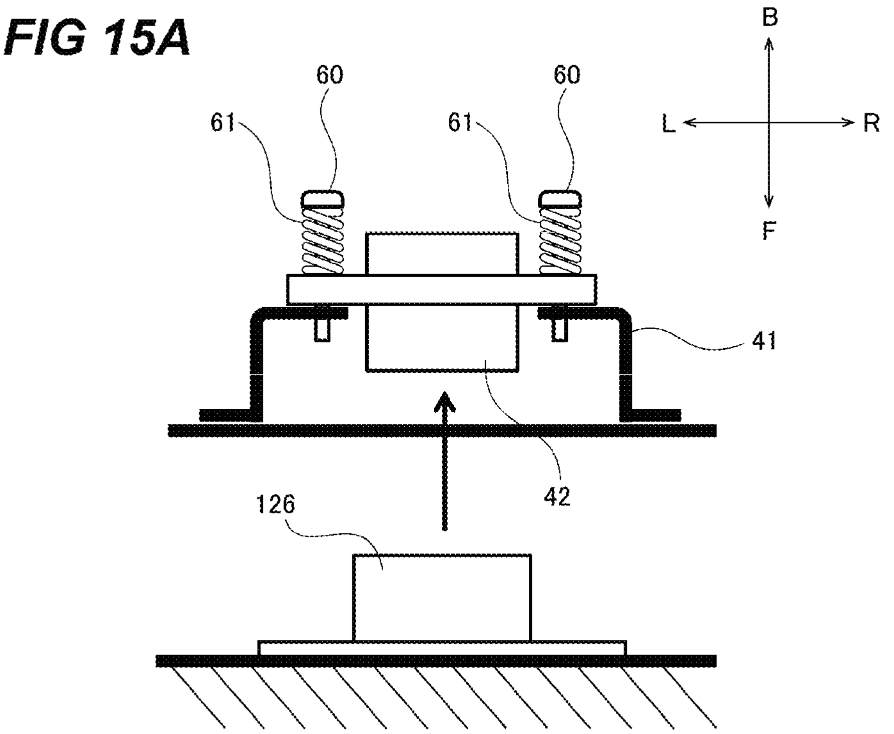
FIGS. 15A and 15B are enlarged cross-sectional views of a connector portion of the image forming apparatus and the processing unit.
Figure 15B:
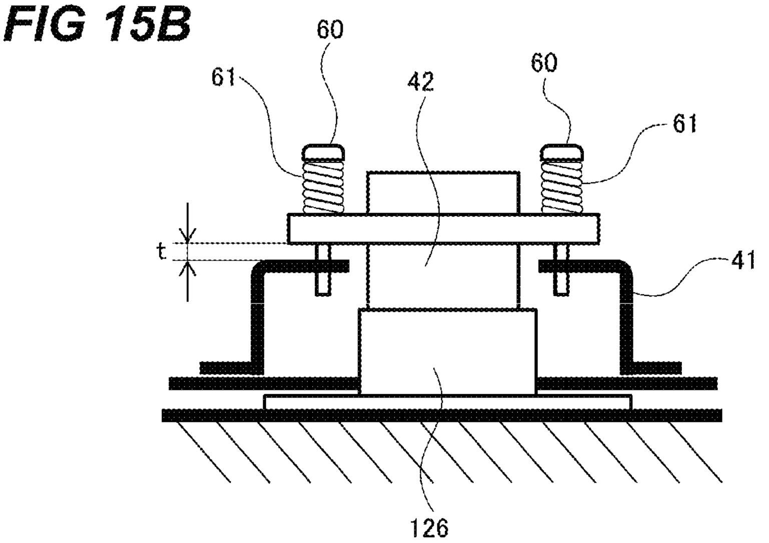

Hereinafter, with reference to FIGS. 5A, 5B, 11, 14, 15A and 15B, a positioning configuration of the processing unit in the front-rear direction with respect to the image forming apparatus 1 will be described. FIG. 14 is a cross-sectional view of the image forming apparatus and the processing unit. FIGS. 15A and 15B are enlarged cross-sectional views of a connector portion of the image forming apparatus and the processing unit, and a cross-sectional position is a position indicated by the line A-A in FIG. 1.

As illustrated in FIG. 11, the apparatus body 100 of the image forming apparatus 1 includes a lever 51 serving as a movement restriction portion that restricts movement of the inner finisher 120 in a direction (rear direction) opposite to the insertion direction (front direction) in the front-rear direction (second direction). The lever 51 is provided on the front side of the in-body lower cover 30, and is provided to be able to protrude upward from the in-body lower cover 30 toward the inner finisher 120. The lever 51 is an engaging portion that protrudes from the upper surface of the in-body lower cover 30 into the in-body space and is engaged with the inner finisher 120.

The lever 51 is provided to be retractable inward from the upper surface of the in-body lower cover 30, and is elastically biased in the direction of the in-body space by a spring (not illustrated). As a result, the lever 51 can take two postures of a state of protruding into the in-body space and a state of retracting. The lever 51 protrudes into the in-body space in a normal state. In addition, as illustrated in FIG. 11, in the front-rear direction, the lever 51 has a shape in which the front side is an inclined surface 51*a* inclined downward in the front direction F, and the rear side is a vertical surface 51*b*.

On the other hand, as illustrated in FIG. 5B, the inner finisher 120 includes an engagement groove 127 to be engaged with the lever 51 on the apparatus body 100 side. The engagement groove 127 is provided on the lower surface 120*a* of the inner finisher 120, extends in the left-right direction (first direction), and is a groove recessed toward the inside of the inner finisher 120. The engagement groove 127 is disposed close to the front side in the front-rear direction, and is provided closer to the front side than the protrusion 122.

With the above configuration, the positioning of the inner finisher 120 in the front-rear direction is performed by engaging the engagement groove 127 on the processing unit side with the vertical surface 51*b* on the rear side of the lever 51 disposed on the in-body lower cover 30.

FIG. 14 illustrates the engagement groove 127 disposed on the lower surface of the inner finisher 120 in a transmissive state, and the lever 51 is indicated by a dashed line.

As can be seen from the positional relationship illustrated in FIG. 14, the vertical surface of the lever 51 is engaged with the engagement groove 127 by an amount of protrusion into the in-body space. Since the vertical surface of the lever 51 is engaged with the engagement groove 127 as described above, the movement of the inner finisher 120 to the front side can be restricted, and thus the inner finisher 120 can be prevented from falling off from the image forming apparatus 1.

Note that the inner finisher 120 is in contact with the upper surface of the in-body lower cover 30 by its own weight, and if the protruding amount of the lever 51 into the in-body space has a predetermined height (for example, about 5 mm), the sufficiently engaged state can be maintained.

In addition, when the inner finisher 120 is inserted into the in-body space of the image forming apparatus 1, first, the rear end (the end on the rear side) of the inner finisher 120 is engaged with the inclined surface 51*a* of the lever 51, and the lever 51 is pushed downward, so that there is no load on the mounting operation. Further, when the inner finisher 120 is inserted, the lever 51 is kept pushed down from the lower surface 120*a* of the inner finisher 120 until the vertical surface 51*b* is engaged with the engagement groove 127.

On the other hand, the inner finisher 120 is detached from the image forming apparatus 1 by a retracting unit (not illustrated) of the lever 51 releasing the engagement between the lever 51 and the engagement groove 127 and pulling out the inner finisher 120 to the front side.

Here, a configuration of the drawer connector 42 disposed in the main body connection portion 40 will be described with reference to FIGS. 15A and 15B.

The image forming apparatus 1 includes a pressing spring 61 serving as a biasing member that applies a force to the drawer connector 42 in a direction of being engaged with the drawer connector 126. The drawer connector 42 is biased in the front direction of the apparatus body 100 by the pressing spring 61 that is fixed to the drawer holding plate 41 by a stepped screw 60. The pressing spring 61 is disposed at two locations to be engaged with ribs protruding to the left and right of the drawer connector 42. That is, both sides of the drawer connector 42 in the left-right direction are biased by the pressing springs 61.

As can be seen from FIG. 15B, the drawer connector 42 can be retracted in the rear direction with respect to the drawer holding plate 41 up to a range t in which the pressing spring 61 can be compressed. As a result, even if the dimension of the inner finisher 120 in the depth direction varies, this variation can be absorbed in a retractable range t of the drawer connector 42, and the inner finisher 120 can be pushed into the image forming apparatus 1. Therefore, the position of the engagement groove 127 on the processing unit side does not deviate from the position of the lever 51 on the apparatus body 100 side, and the fitting of the pair of drawer connectors (42, 126) can be secured.

At the same time, since the inner finisher 120 is biased in the front direction by the reaction force of the pressing spring 61, abutting of the engagement groove 127 against the vertical surface 51*b* of the lever 51 is also secured. In other words, the lever 51 also serves as a receiving portion that receives the biasing force from the pressing spring 61. This can reduce positional deviation and positional variation in the depth direction of the inner finisher 120.

As described above, by providing the positioning configuration of the inner finisher 120 in the front-rear direction, the inner finisher 120 that is a processing unit does not fall off to the front side of the image forming apparatus 1, and positional deviation and positional variation can be reduced. Note that the same effect can be achieved by configuring the buffer path unit 130 similarly to the inner finisher 120 described above.

(Positioning Configuration of Processing Unit/Up-Down Direction)

Figure 16A:
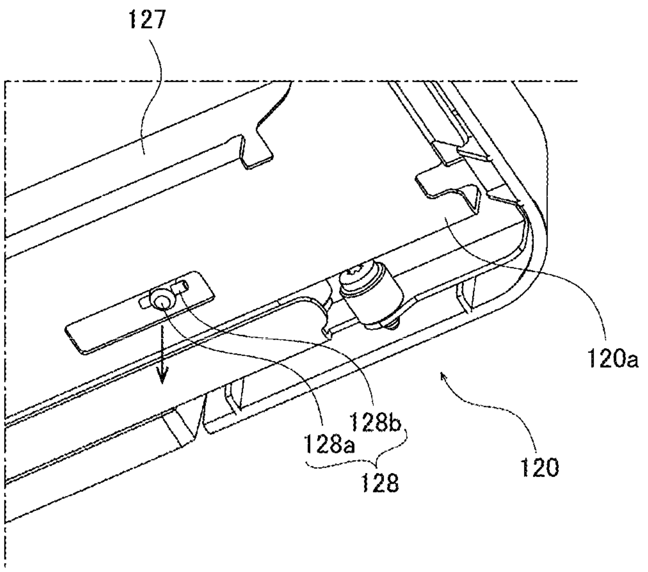
FIGS. 16A and 16B are partially enlarged perspective views of the processing unit.
Figure 16B:
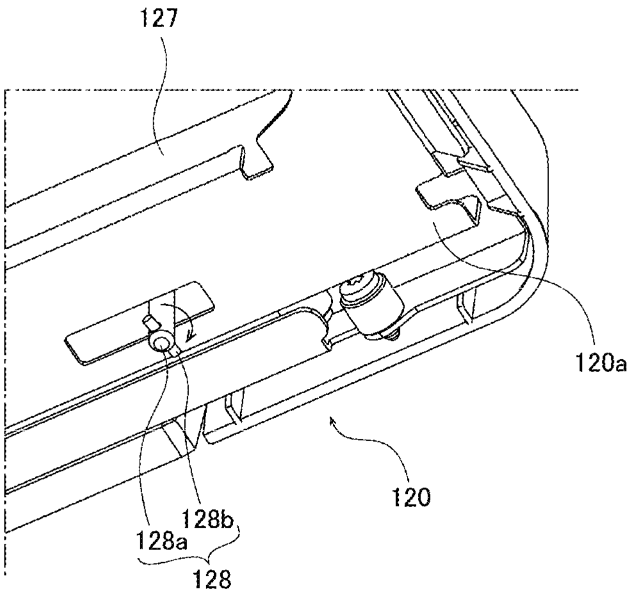

Finally, the vertical positioning configuration of the processing unit with respect to the image forming apparatus 1 will be described with reference to FIGS. 5B, 10, 11, 16A, and 16B. FIGS. 16A and 16B are partially enlarged perspective views of the processing unit.

Basically, as described above, the inner finisher 120 that is a processing unit is grounded to the in-body lower cover 30 by its own weight, but desirably includes a reliable floating restriction portion. Therefore, a positioning configuration in the up-down direction is also provided.

As illustrated in FIGS. 10 and 11, the image forming apparatus 1 includes engagement holes 52A and 52B which are floating restricting portions that restrict a position of the inner finisher 120 in the up-down direction (third direction). The engagement holes 52A and 52B are disposed in the in-body lower cover 30 on the apparatus body 100 side.

On the other hand, as illustrated in FIGS. 16A and 16B, the inner finisher 120 includes a positioning pin 128 engaged with the engagement hole 52A (or the engagement hole 52B). The positioning pin 128 is provided on the lower surface 120*a* of the inner finisher 120, and is provided to be able to protrude downward from the lower surface 120*a*.

The positioning pin 128 is configured by a parallel pin 128*b* having a length equal to or larger than a diameter of a shaft 128*a* being fixed to a tip of the shaft 128*a* having a predetermined diameter. The parallel pin 128*b* is fixed in a direction intersecting the shaft 128*a*.

Further, the positioning pin 128 can take two states of a retracted position illustrated in FIG. 16A and a protruding position illustrated in FIG. 16B with respect to the lower surface of the inner finisher 120.

Further, the positioning pin 128 can be rotated by 90°, and in FIG. 16B, it can be seen from the phase of the parallel pin 128*b* at the tip that the positioning pin is rotated by 90° in the direction of the arrow with respect to the state in FIG. 16A.

Further, the above-described engagement hole 52A is disposed to directly face the positioning pin 128 on the lower surface of the inner finisher 120 in a state in which a position of the inner finisher 120 is determined through the engagement with each of the positioning shaft 123, the protrusion 122, and the engagement groove 127.

In this directly facing state, as illustrated in FIG. 16B, the positioning pin 128 is rotated to protrude downward from the lower surface 120*a* of the inner finisher 120. As a result, the parallel pin 128*b* at the tip of the positioning pin 128 is caught on the rear surface of the engagement hole 52A, and floating of the inner finisher 120 is prevented.

With the above-described configuration, it is possible to appropriately guide attachment and detachment of the processing unit to and from the apparatus body 100 and fitting of the pair of drawer connectors, and it is possible to reduce a risk of connection failure or breakage of the drawer connectors.

(Configuration of Unit Connection Portion of Processing Unit)

Note that, in the above-described embodiment, the configuration in which the inner finisher 120 (or the buffer path unit 130) that is one processing unit is mounted on the in-body lower cover 30 in the in-body space of the apparatus body 100 of the image forming apparatus 1 has been described as an example. However, the present invention is not limited thereto. For example, the present invention is also effective in a configuration in which a plurality of processing units is mounted on the in-body lower cover 30 in the in-body space of the apparatus body 100 of the image forming apparatus 1.

Figure 17:
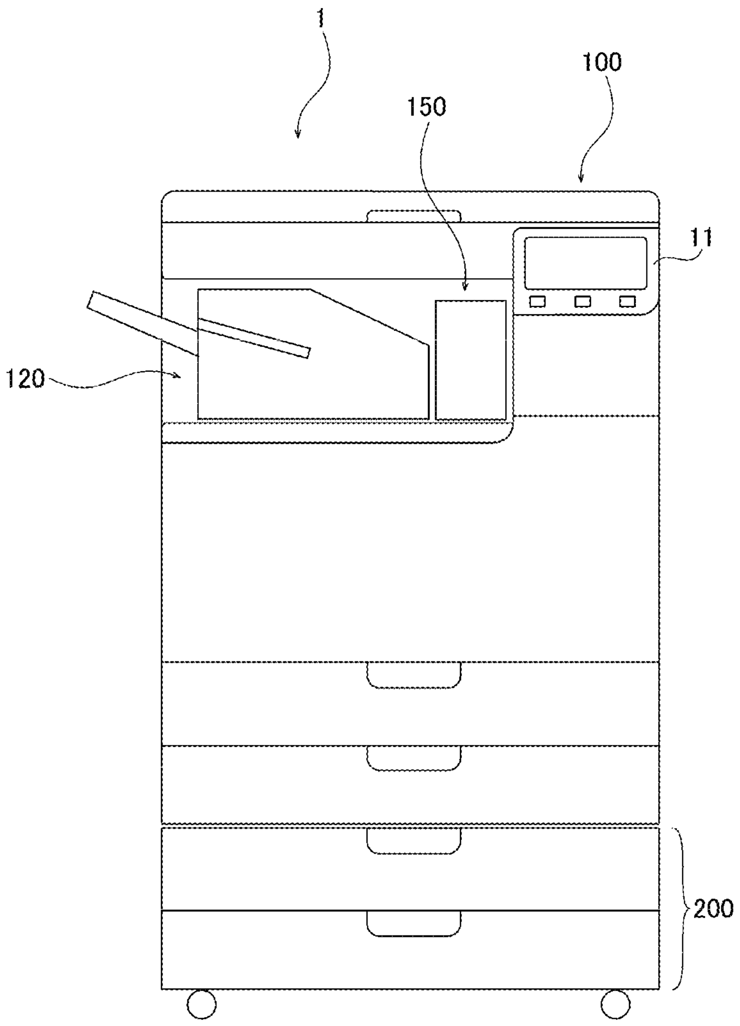
FIG. 17 is a front view of the image forming apparatus and the processing unit.

As illustrated in FIG. 17, depending on a mounting state of the processing unit, the inner finisher 120 may be mounted on the image forming apparatus 1 in a state of being moved in the left direction. FIG. 17 illustrates a state in which a punch unit 150 that is a processing unit different from the inner finisher 120 is mounted between the pair of discharge rollers 20 and the inner finisher 120. As can be seen from FIG. 17, the inner finisher 120 is moved in the left direction by the width dimension of the punch unit 150.

Figure 18:
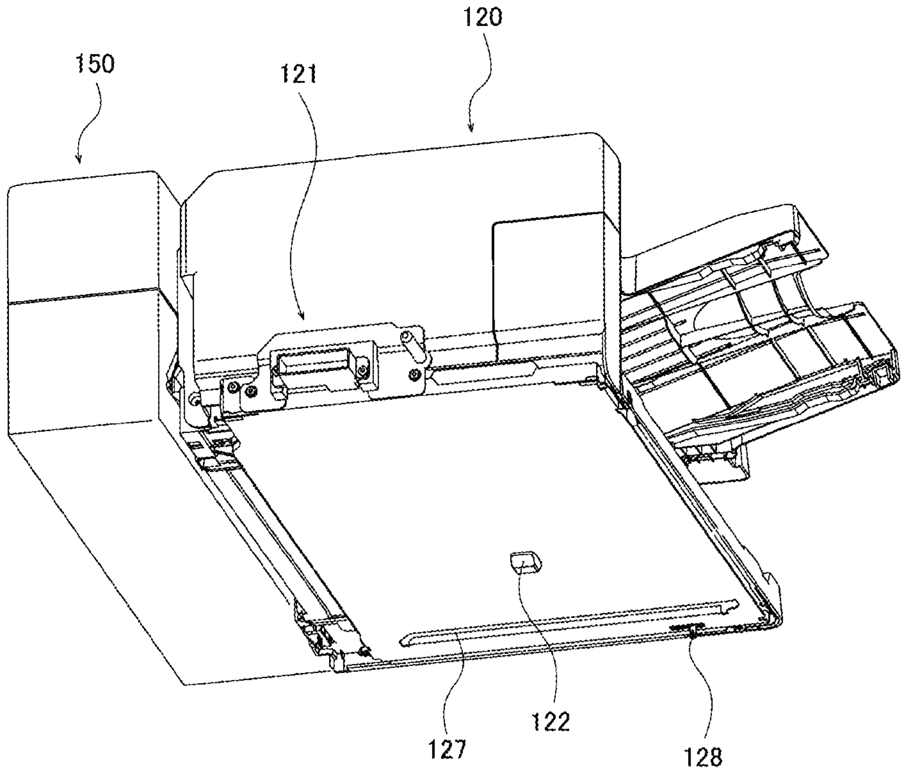
FIG. 18 is a perspective view of the processing unit.

FIG. 18 illustrates a position of the unit connection portion 121 of the inner finisher 120 mounted at the position illustrated in FIG. 17. It can be seen that the position of the unit connection portion 121 of the inner finisher 120 illustrated in FIG. 18 is moved from the position illustrated in FIG. 5B to the punch unit 150 side.

That is, in the inner finisher 120, the unit connection portion 121 including the drawer connector 126 can be disposed to be movable to two positions corresponding to the presence or absence of the punch unit 150. In other words, in the inner finisher 120, the unit connection portion 121 including the drawer connector 126 can be disposed to be movable to two positions according to an installation position on the in-body lower cover 30. Here, as installation positions of the inner finisher 120, a first installation position (see FIG. 2) in a case where the punch unit 150 is not provided and a second installation position (see FIG. 17) in a case where the punch unit 150 is provided are exemplified.

In the inner finisher 120 in a case where the punch unit 150 is not provided, the unit connection portion 121 including the drawer connector 126 is installed at the first position illustrated in FIG. 5B corresponding to the first installation position illustrated in FIG. 2. On the other hand, in a case where the punch unit 150 is provided, the inner finisher 120 is configured such that the unit connection portion 121 including the drawer connector 126 can be installed at the second position illustrated in FIG. 18 corresponding to the second installation position illustrated in FIG. 17 different from the first installation position. With this configuration, the drawer connector 126 of the inner finisher 120 can be fitted to the drawer connector 42 on the apparatus body side regardless of the presence or absence of other processing units.

The same applies to the positioning shaft 123 disposed on the unit connection portion 121. That is, the positioning shaft 123 is provided in the unit connection portion 121 together with the drawer connector 126. Therefore, the positioning shaft 123 is movable to the first position and the second position in the left-right direction (first direction) in the inner finisher 120 together with the drawer connector 126.

Note that the unit connection portion 121 of the inner finisher 120 is movable to the first position and the second position different from the first position, but the protrusion 122 and the positioning pin 128 disposed on the lower surface 120*a* of the inner finisher 120 are moved together with the movement of the inner finisher 120.

Therefore, the groove portion of the apparatus body 100 of the image forming apparatus 1 includes the groove 50A that is a first groove portion and a groove 50B that is a second groove portion formed at a position different from the groove 50A in the left-right direction (first direction). The protrusion 122 of the inner finisher 120 can be engaged with both the groove 50A and the groove 50B. Thus, the protrusion 122 of the inner finisher 120 is engaged with one of the groove 50A and the groove 50B when the inner finisher 120 is mounted in the in-body space of the apparatus body 100. Out of the groove 50A and the groove 50B, a cavity is formed between a groove not fitted with the protrusion 122 and the lower surface of the inner finisher 120.

Similarly, the floating restriction portion included in the apparatus body 100 of the image forming apparatus 1 includes an engagement hole 52A that is a first floating restriction portion, and an engagement hole 52B that is a second floating restriction portion formed at a position different from the engagement hole 52A in the left-right direction (first direction). The positioning pin 128 of the inner finisher 120 is engaged with one of the engagement hole 52A and the engagement hole 52B when the inner finisher 120 is mounted in the in-body space.

Specifically, when the unit connection portion 121 of the inner finisher 120 is disposed at the first position illustrated in FIG. 5B, the protrusion 122 is engaged with the groove 50A, and the positioning pin 128 is engaged with the engagement hole 52A. On the other hand, when the unit connection portion 121 of the inner finisher 120 is installed at the second position illustrated in FIG. 18 different from the first position, the protrusion 122 is engaged with the groove 50B, and the positioning pin 128 is engaged with the engagement hole 52B.

As illustrated in FIG. 11, the positioning state is not changed since the groove 50B and the engagement hole 52B having the same shapes as the groove 50A and the engagement hole 52A at the first position are disposed at the second position after the movement of the unit connection portion 121.

Figure 19:
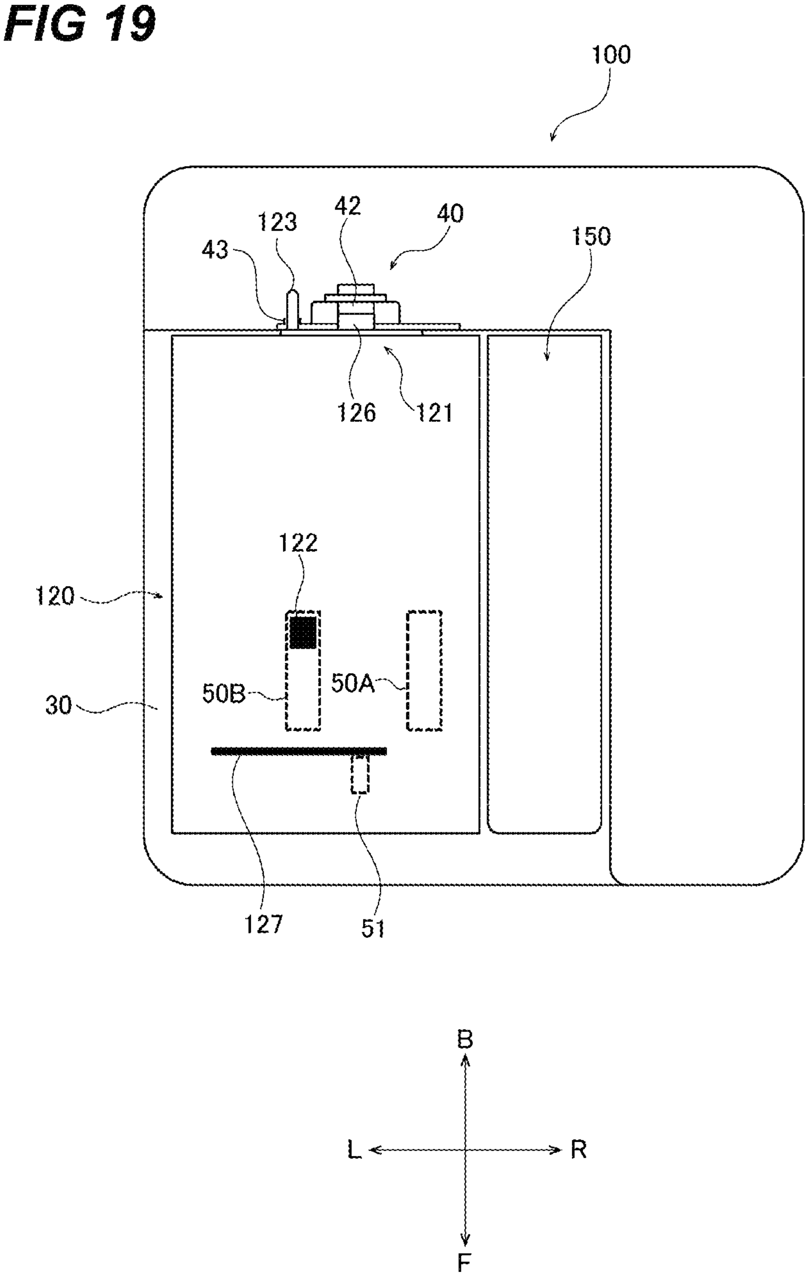
FIG. 19 is a cross-sectional view of the image forming apparatus and the processing unit.

FIG. 19 illustrates an engagement state of each of the positioning shaft 123, the protrusion 122, and the engagement groove 127 in the state in which the punch unit 150 is mounted, but it can be seen that there is no advantage from the state without the punch unit 150 (see FIG. 14).

In the above-described embodiment, the configuration in which the unit connection portion 121 can be disposed at two different positions has been exemplified, but the present invention is not limited thereto, and the unit connection portion may be disposed at three or more positions. In this case, the groove portion and the floating restriction portion to be engaged with the protrusion 122 and the positioning pin 128 may also be provided at a plurality of positions corresponding to the disposition of the unit connection portion 121. In addition, the lever 51 and the engagement groove 127 that perform positioning in the front-rear direction are disposed closer to the front than the protrusion 122, but disposition is not limited thereto, and may be disposed closer to the rear than the protrusion 122.

Furthermore, positioning using the positioning shaft 123 is not necessarily required depending on a shape of the protrusion 122. For example, when a distance of the protrusion 122 in the front-rear direction is sufficiently long, a position of the processing unit is restricted without turning in the left-right direction only by the engagement between the protrusion 122 and the groove 50A (or the groove 50B), and there is no load on the fitting of the pair of drawer connectors.

Here, a configuration of the inner finisher 120 will be briefly described. The inner finisher 120 includes: a pair of conveying rollers 321 that conveys a sheet sent out from the pair of discharge rollers 20 of the image forming apparatus 1; a sheet guide 323 that guides the sheet conveyed by the pair of conveying rollers 321; a pair of conveying rollers 322 that conveys the sheet conveyed by the pair of conveying rollers 321; a processing tray 324 on which the sheet conveyed by the pair of conveying rollers 321 is placed; a paddle 325 that reversely conveys the sheet on the processing tray 324; a restriction member 327 that restricts an end (a downstream end of an arrow R of the sheet) of the sheet reversely conveyed by the paddle 325; a pair of aligning plates 326 (disposed on both sides in the sheet width direction) that performs alignment in the width direction of the sheet; and a stapler 328 that performs a binding process on a plurality of sheets (sheet bundle) aligned by the restriction member 327 and the aligning plate 326; a pair of discharge rollers 329*a* and 329*b* that discharges the sheet bundle subjected to the binding process; and a stacking tray 330 that stacks the sheet bundle discharged by the pair of discharge rollers 329*a* and 329*b*.

Figure 20:
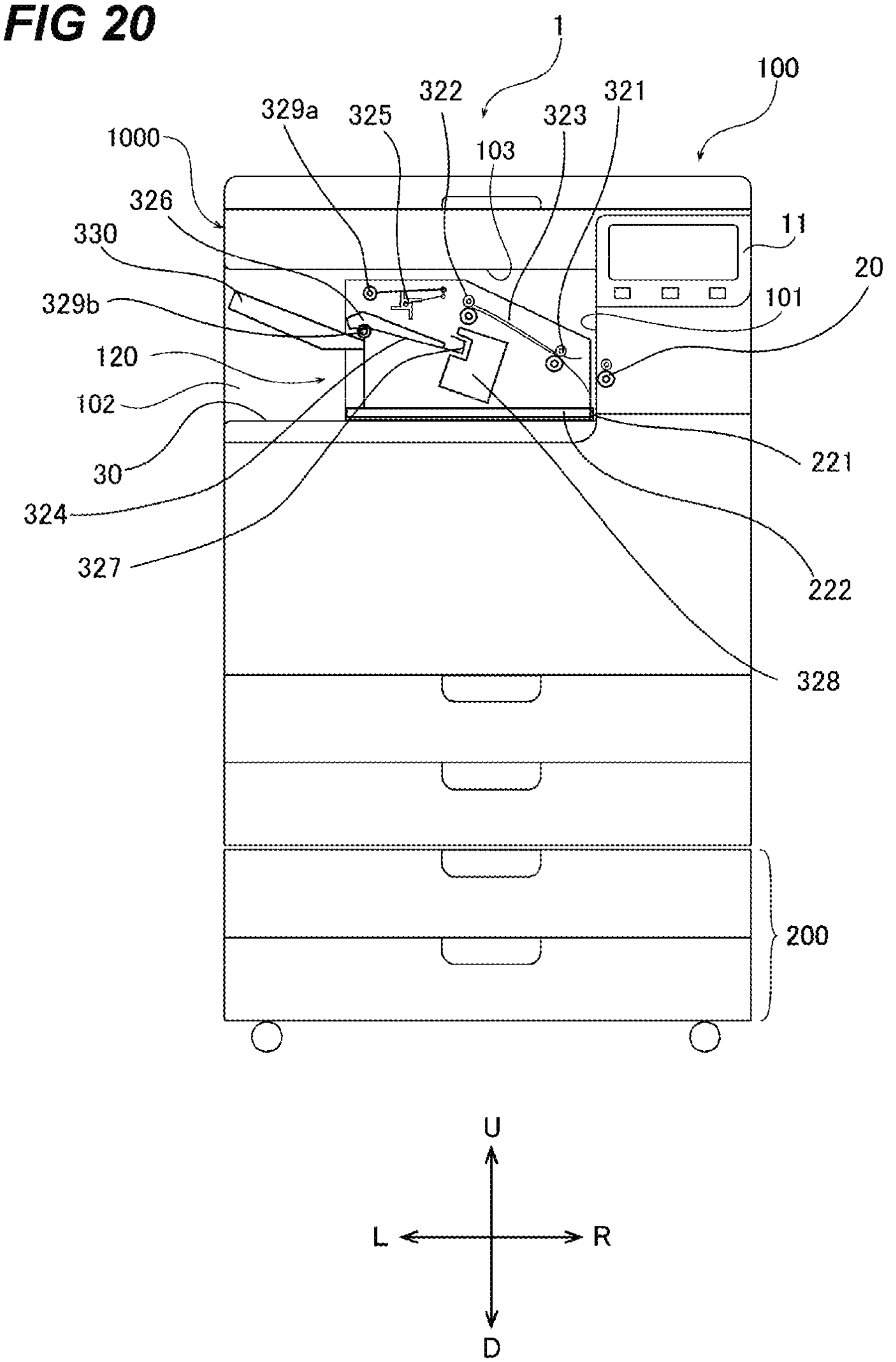
FIG. 20 is a front view of the image forming apparatus and the processing unit.
Figure 21:
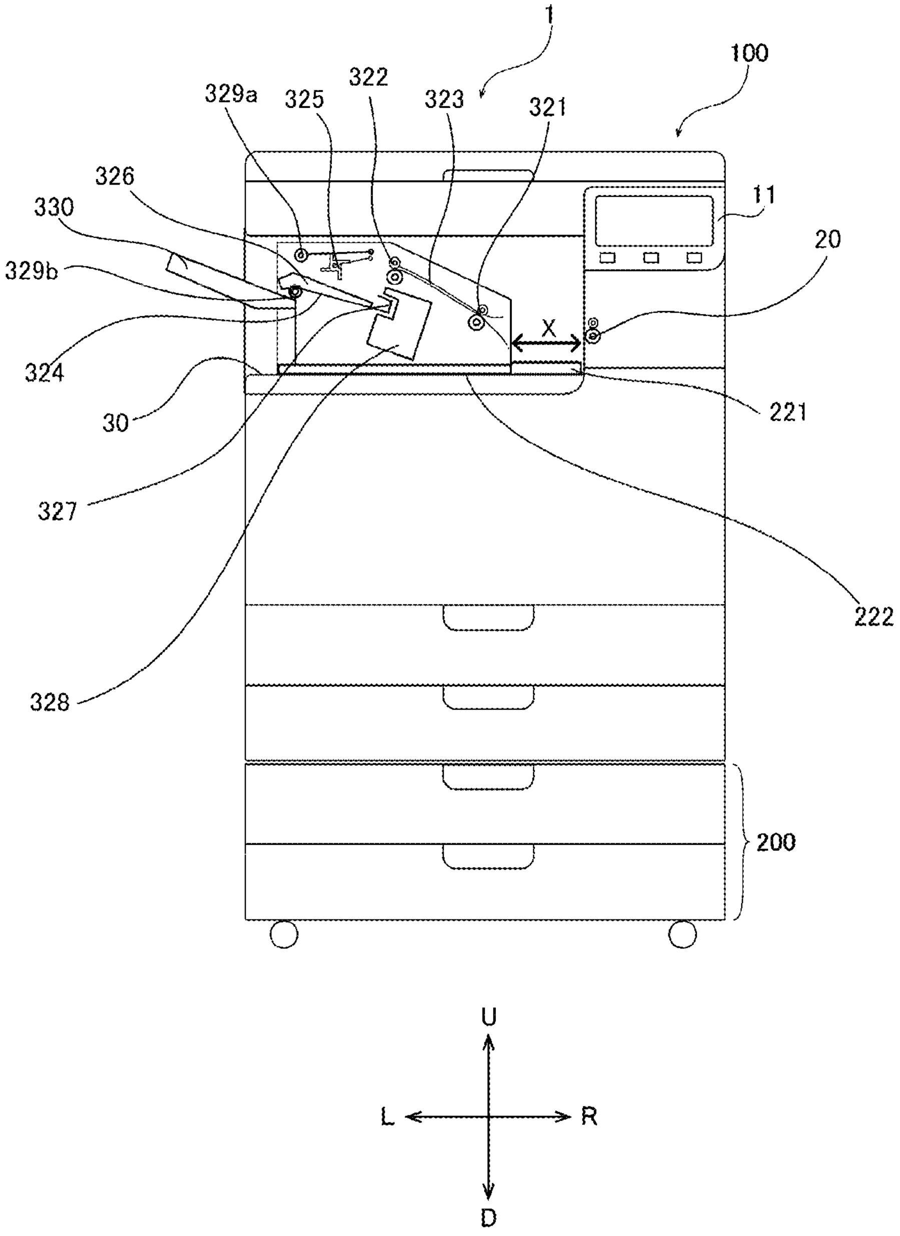
FIG. 21 is a front view of the image forming apparatus and the processing unit.

In such an inner finisher 120, in a case where a sheet is jammed between the pair of conveying rollers 321 and the pair of conveying rollers 322, in order to make it easy for a user to remove the jammed sheet, it is conceivable to move the inner finisher 120 in a direction of an arrow L in FIG. 20 to separate the inner finisher 120 from the pair of discharge rollers 20 of the image forming apparatus 1 (See FIGS. 20 and 21).

Therefore, when the unit connection portion 121 is fixed to a casing of the inner finisher 120, the inner finisher 120 cannot be moved in a direction of an arrow X in FIG. 21. Therefore, in the present embodiment, a slide rail 220 (see FIG. 22) having a fixed frame 221 and a movable frame 222 slidable in the direction of the arrow X with respect to the fixed frame 221 is provided. The inner finisher 120 is attached to the movable frame 222, and the unit connection portion 121 is attached to the fixed frame 221. The inner finisher 120 and the drawer connector 126 are electrically connected by using a harness 230 (see FIG. 30), and the drawer connector 126 on the inner finisher 120 side and the drawer connector 42 on the image forming apparatus 1 side are electrically connected.

Figure 25:
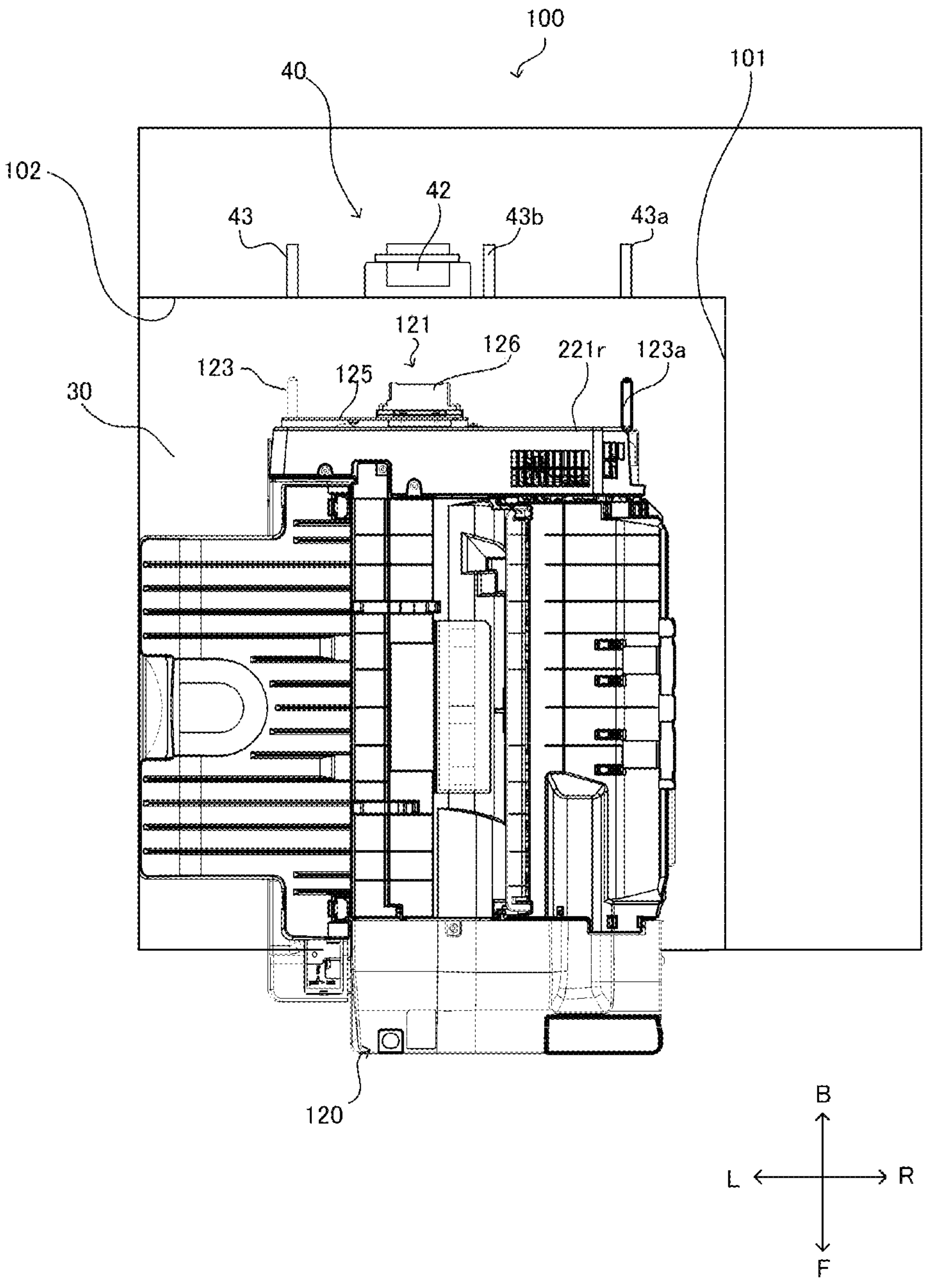
FIG. 25 is a cross-sectional view of the image forming apparatus and the processing unit.

That is, in a state in which the inner finisher 120 is attached to the slide rail 220, the slide rail 220 and the inner finisher 120 are inserted in a direction of an arrow B in FIG. 25 on the installation surface of the in-body lower cover 30 (the in-body space defined by the in-body lower cover 30, the discharge portion disposition surface 101, and the connector disposition surface 102). Thus, the positioning shaft 123 fixed to the fixed frame 221 via the unit drawer holding plate 125 is fitted to the positioning hole 43, the positioning shaft 123*a* fixed to the fixed frame 221 is fitted to the positioning hole 43*a* (see FIG. 25), and the drawer connector 126 and the drawer connector 42 fixed to the fixed frame 221 via the unit drawer holding plate 125 are engaged, so that the inner finisher 120 and the image forming apparatus 1 are electrically connected. That is, the slide rail 220 is a separation mechanism that separates the processing unit from the pair of discharge rollers 20 in the left-right direction in a state in which the drawer connector 42 and the drawer connector 126 are fitted. The inner finisher 120 serving as a processing unit includes the slide rail 220 serving as a separation mechanism.

Figure 22:
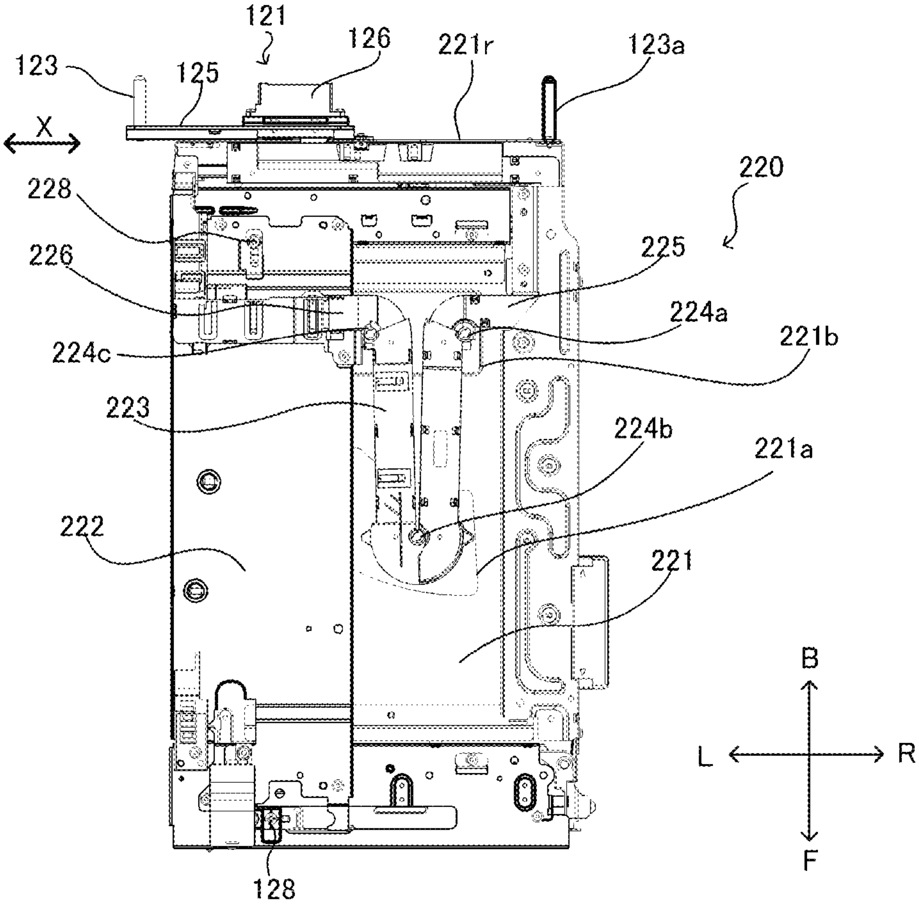
FIG. 22 is a top view of a slide rail.
Figure 23:
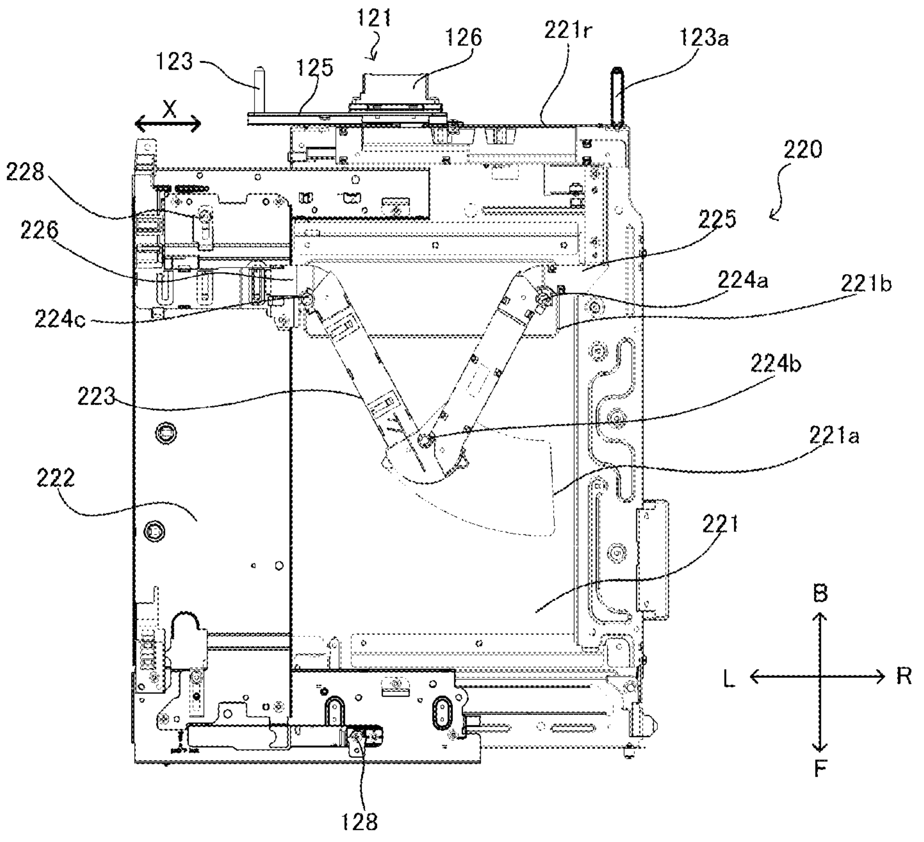
FIG. 23 is a top view of the slide rail.
Figure 33:
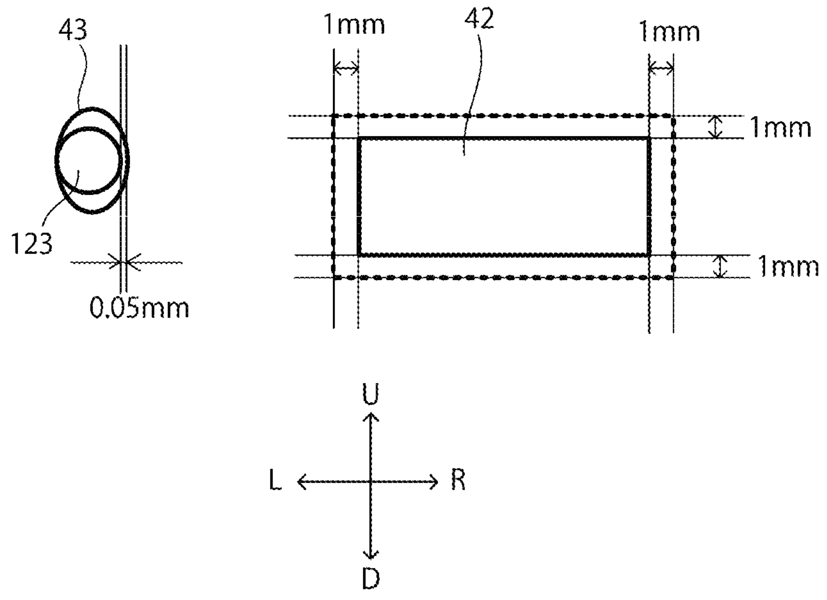
FIG. 33 is a diagram illustrating a modification example of the slide rail.

As illustrated in FIGS. 22 and 23, the drawer connector 126 of the present embodiment is fixed to the fixed frame 221. As illustrated in FIG. 33, the drawer connector 42 on the image forming apparatus side is held to be movable in up, down, left, right, and oblique directions (about 1 mm from the center in the plane direction). Therefore, when the drawer connector 126 abuts on the drawer connector 42 at the time of inserting the inner finisher 120, the drawer connector 42 is fitted while being moved to be aligned with the regular fitting position. A length (about 0.05 mm) of a difference (a gap at the time of insertion) between the diameter of the positioning shaft 123 in the left-right direction (a direction of an arrow LR) and the diameter of the positioning hole 43 in the left-right direction is set shorter than a movable distance of the drawer connector 42.

As a result, when a user moves the inner finisher 120 in the direction of the arrow L in order to remove the jammed sheet in a state in which the inner finisher 120 is mounted in the in-body space, the force received by the fixed frame 221 in the direction of the arrow Lis received by the positioning hole 43 via the positioning shaft 123, and a load is not applied to the fitting portion of the drawer connector.

With such a configuration, in a state in which the image forming apparatus 1 and the inner finisher 120 are connected via the drawer connectors 42 and 126, the user can move the inner finisher 120 in the direction of the arrow L and remove the jammed sheet in the inner finisher 120. Hereinafter, a configuration of the slide rail 220 will be described, but the same members as those in the above-described embodiment are denoted by the same reference numerals, and a detailed description thereof will be omitted.

Figure 24:
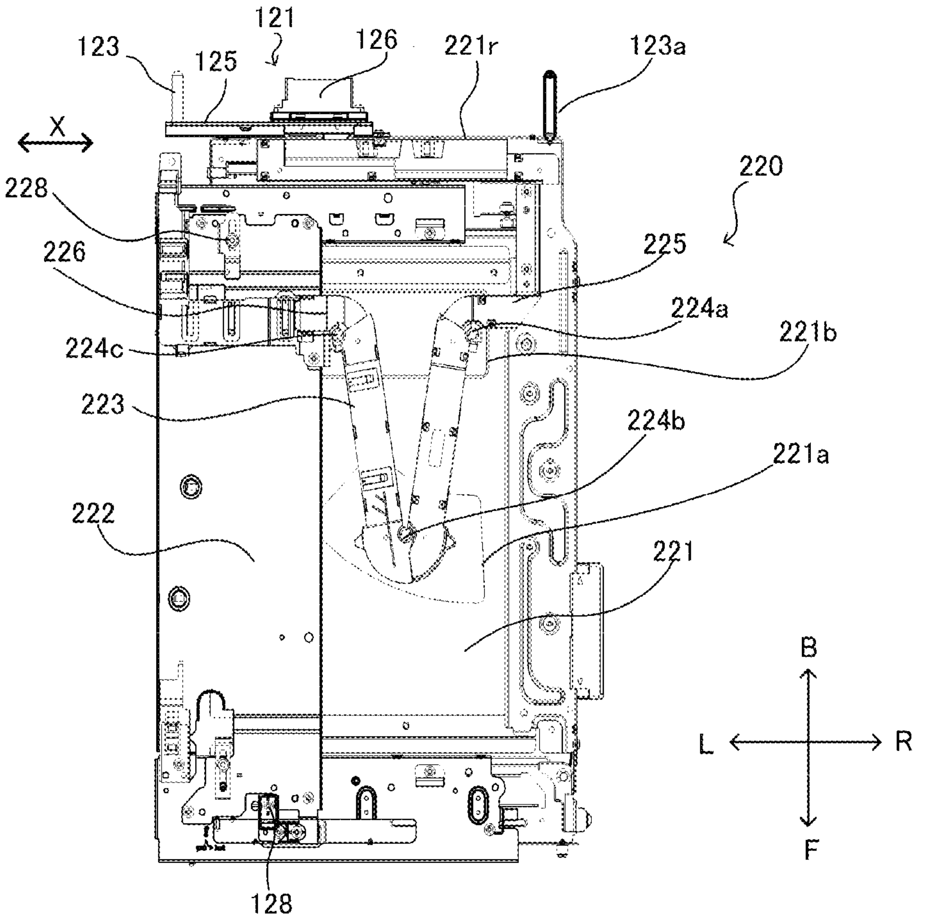
FIG. 24 is a top view of the slide rail.

FIGS. 22 to 24 are views of the slide rail 220 when viewed from above. The slide rail 220 includes a fixed frame 221 and a movable frame 222 slidable in the direction of the arrow X with respect to the fixed frame 221. The fixed frame 221 is provided with a guide groove that guides movement of the movable frame 222 in the direction of the arrow X, and the movable frame 222 moves in the direction of the arrow X along the guide groove.

FIG. 22 illustrates a positional relationship between the fixed frame 221 and the movable frame 222 in a state in which the inner finisher 120 is operable (states in FIGS. 20 and 26) (the movable frame 222 is at the first position with respect to the fixed frame 221). FIG. 23 illustrates a positional relationship between the fixed frame 221 and the movable frame 222 in a state in which the inner finisher 120 is separated from the pair of discharge rollers 20 (a state in FIG. 21) (the movable frame 222 is located at the second position with respect to the fixed frame 221). FIG. 24 illustrates a positional relationship between the fixed frame 221 and the movable frame 222 (the movable frame 222 is at the third position with respect to the fixed frame 221) when the inner finisher 120 is mounted in the in-body space (FIG. 25).

The unit drawer holding plate 125 is fixed to a rear side surface 221*r* of the fixed frame 221 (which is a surface facing the drawer connector 42 of the image forming apparatus 1 in a state in which the inner finisher 120 and the slide rail 220 are mounted in the in-body space or does not have to be a surface), and the positioning shaft 123 and the drawer connector 126 are fixed to the unit drawer holding plate 125 as described above. Further, another positioning shaft 123*a* is fixed to the rear side surface 221*r* of the fixed frame 221.

The positioning shafts 123 and 123*a* and the drawer connector 126 are fixed to the rear side surface 221*r* to extend in a direction of an arrow B (a direction toward the rear side in the front-rear direction) in a state in which the inner finisher 120 and the slide rail 220 are mounted in the in-body space.

The slide rail 220 is provided with harness guides 223 for routing a harness that connects a substrate (not illustrated) of the inner finisher 120 to the drawer connector 126. One of the harness guides 223 is fixed to the fixed frame 221 via a fixed frame connection portion 225, and the other is fixed to the movable frame 222 via a movable frame connection portion 226. The harness guide 223 between the fixed frame connection portion 225 and the movable frame connection portion 226 is provided to be bent via shafts 224*a*, 224*b*, and 224*c*, and is configured such that a bending angle changes as the movable frame 222 moves in the direction of the arrow X with respect to the fixed frame 221. Specifically, the harness guide 223 is configured such that the shaft 224*b* is freely movable in a range of an opening 221*a* provided in the fixed frame 221, and the shaft 224*a* and the shaft 224*c* are freely movable in a range of an opening 221*b* provided in the fixed frame 221. Therefore, as illustrated in FIG. 23, even if the movable frame 222 moves to the second position, an angle of the bent portion expands while the harness guide 223 moves, so that the harness 230 in the harness guide 223 is prevented from being pulled and disconnected.

The positioning pin 128 is provided on the front side of the fixed frame 221 of the slide rail 220. The positioning pin 128 is engaged with the engagement hole 52A or 52B of the image forming apparatus 1 by being pushed downward and rotated in a state in which the inner finisher 120 is mounted. As a result, floating of the slide rail 220 and the inner finisher 120 is prevented, and movement of the slide rail 220 and the inner finisher 120 in the front direction (arrow F direction) and rotation thereof about the vertical direction are restricted. That is, the positioning pin 128 functions as a fixing portion that fixes the drawer connector 126 so as not to come off from the drawer connector 42 in a state in which the drawer connector 42 and the drawer connector 126 are fitted.

The slide rail 220 has a stopper 228 that restricts movement of the movable frame 222 with respect to the fixed frame 221. The stopper 228 is slidably attached to the movable frame 222. When the stopper 228 is moved to the fixed position, the movable frame 222 is fitted to a part of the fixed frame to be restricted from moving. The movable frame 222 is movable with respect to the fixed frame 221 by moving the stopper 228 to the release position. The stopper 228 is at a fixed position at the time of product transportation and mounting, and restricts the movement of the movable frame 222 so that the movable frame 222 in a state in which the inner finisher 120 is attached does not move unintentionally. However, when the inner finisher 120 and the slide rail 220 are mounted in the in-body space, the user moves the stopper 228 to the release position.

FIG. 24 illustrates a state (third position) of the slide rail 220 when the inner finisher 120 is mounted in the in-body space of the image forming apparatus 1 in order to connect the drawer connector 126 on the inner finisher 120 side to the drawer connector 42 on the image forming apparatus 1 side. FIG. 25 illustrates a state in which the inner finisher 120 is being inserted into the in-body space in a state of being attached to the movable frame 222 of the slide rail 220 at the third position.

A lower surface (not illustrated) of the slide rail 220 of the present embodiment is provided with the protrusion 122 and the engagement groove 127 illustrated in FIG. 5B. The protrusion 122 is engaged with one of the groove 50A and the groove 50B provided in the in-body lower cover 30, and the engagement groove 127 is engaged with the lever 51 provided in the in-body lower cover 30. These functions and effects are as described above.

In the inner finisher 120 of the present embodiment, the slide rail 220 is inserted into the in-body space by the user at the third position, the positioning shafts 123 and 123*a* are engaged with the positioning holes 43 and 43*a* to connect the drawer connectors (126, 42), and in this state, the user fixes the fixed frame 221 by using the positioning pin 128, and thus the fixed frame 221 is positioned. In other words, the fitting between the drawer connectors (126, 42) is fixed. Thereafter, the user moves the stopper 228 to the release position, moves the inner finisher 120 (movable frame 222) to the right side (a direction of an arrow R), and moves the inner finisher 120 to an operation position (the movable frame 222 is at the first position) illustrated in FIG. 26.

At the operation position, there is a portion where the right end of the inner finisher 120 and a part of the discharge portion disposition surface 101 of the image forming apparatus 1 overlap in the left-right direction. Therefore, when the inner finisher 120 is inserted into the in-body space in a state in which the slide rail 220 is at the first position, it may be difficult to insert the inner finisher 120 due to interference of members. Therefore, the inner finisher 120 is inserted into the in-body space in a state in which the slide rail 220 is at the second position, and the slide rail 220 is moved to the first position when the drawer connectors are connected to each other, so that mounting to the operation position can be smoothly performed.

By mounting the inner finisher 120 in the in-body space using such a slide rail 220, the inner finisher 120 installed in the movable frame 222 can be moved in the direction of the arrow X in a state in which the drawer connector 42 disposed on the connector disposition surface 102 that defines the rear side of the in-body space in the front-rear direction (the direction of the arrow FB) and the drawer connector 126 disposed on the rear side surface 221*r* of the fixed frame 221 of the slide rail 220 are connected. In other words, although the insertion direction (the direction of the arrow B) when the inner finisher 120 is mounted on the image forming apparatus 1 intersects the movement direction (the direction of the arrow X) of the movable frame 222 of the slide rail 220, since the drawer connector 126 on the inner finisher 120 side is attached to the fixed frame 221 of the slide rail 220, the inner finisher 120 can be moved in the direction of the arrow X in a state in which the drawer connector 126 and the drawer connector 42 are connected, and the inner finisher 120 can be separated (moved in the direction of the arrow L) from the pair of discharge rollers 20 for jam recovery in a state in which the inner finisher 120 is mounted in the in-body space.

As described above, in the image forming system of the present embodiment, the punch unit 150 may be disposed between the pair of discharge rollers 20 and the inner finisher 120. Therefore, the unit drawer holding plate 125 (unit connection portion 121) that supports the drawer connector 126 and the positioning shaft 123 is configured to be attachable to the rear side surface 221*r* of the fixed frame 221 of the slide rail 220 at two positions.

Figure 26:
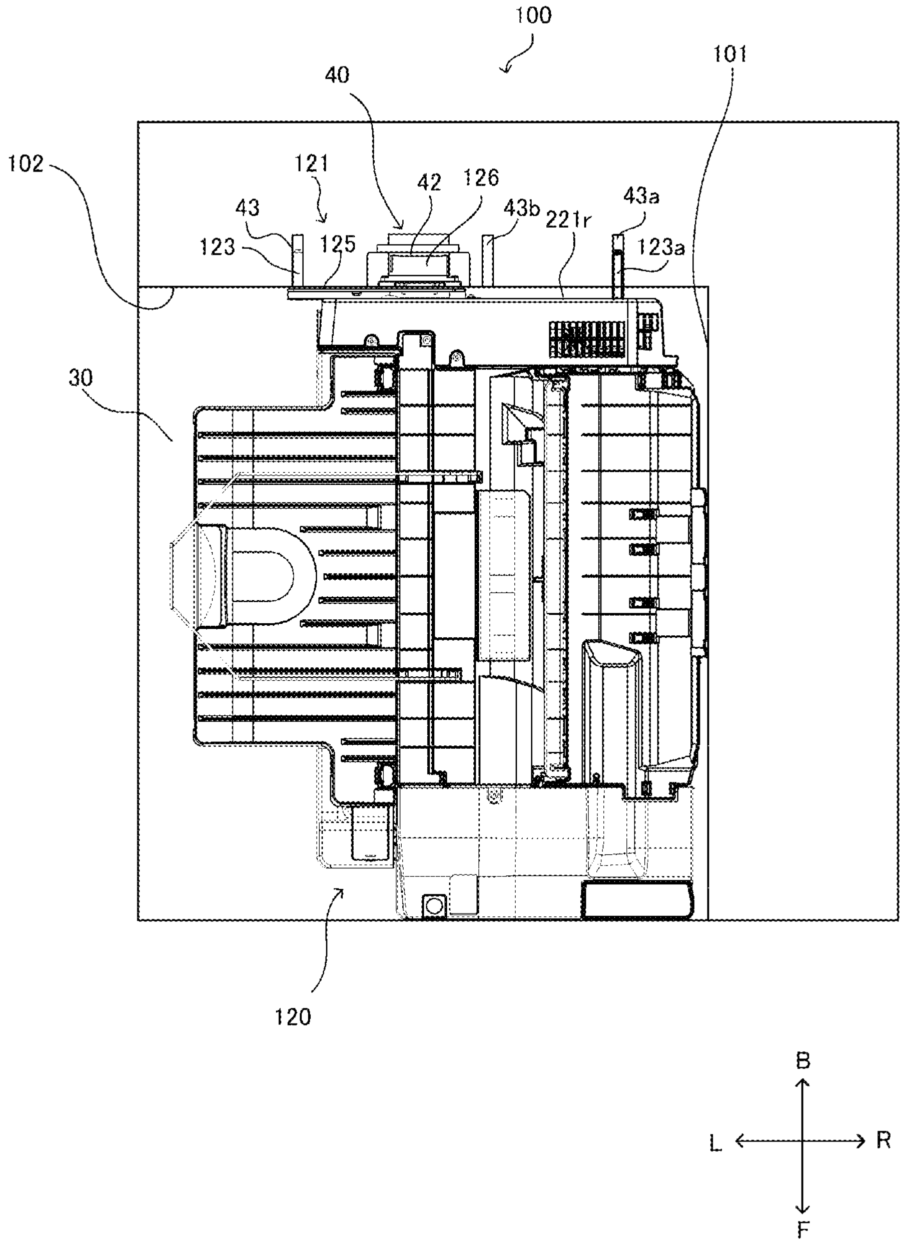
FIG. 26 is a cross-sectional view of the image forming apparatus and the processing unit.
Figure 28:
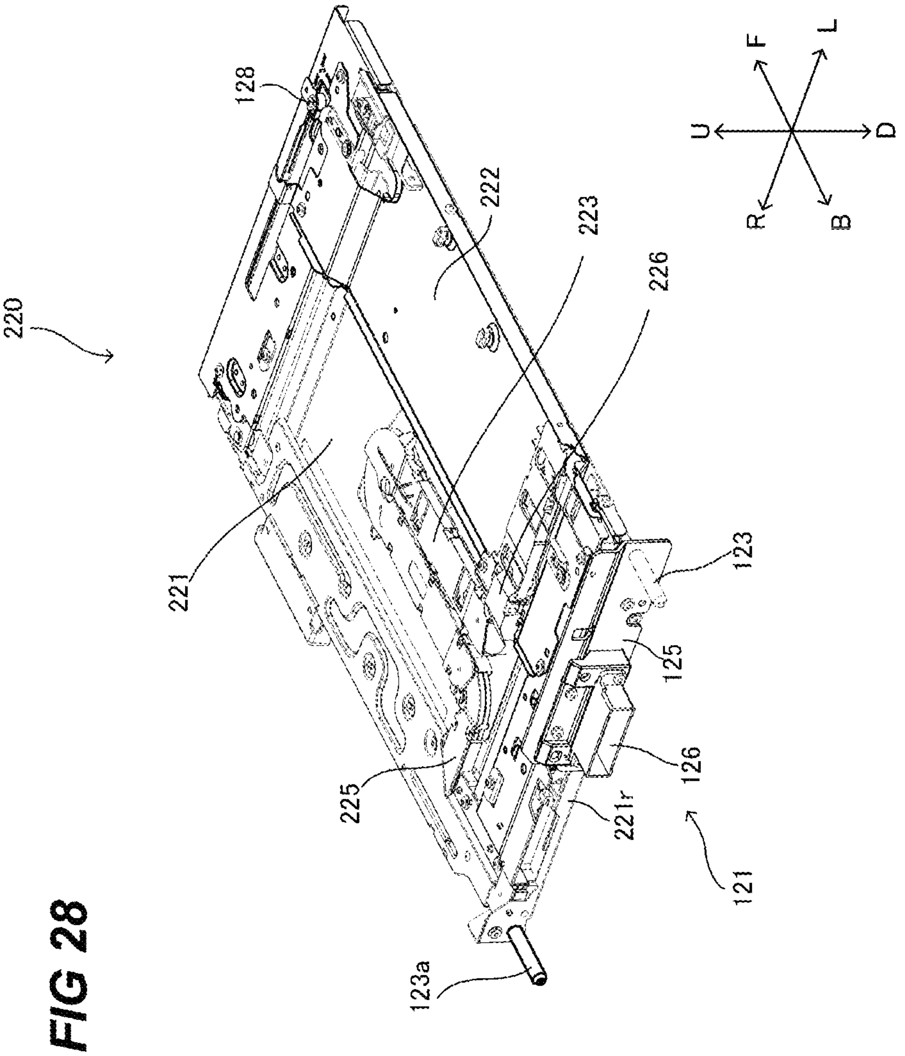
FIG. 28 is a perspective view of the slide rail.

FIG. 28 is a perspective view of the slide rail 220 in a case where the punch unit 150 is not attached (that is, a state in FIG. 26) when viewed from the rear side. In this state, the unit connection portion 121 is attached to a first attachment position on the rear side surface 221*r* of the fixed frame 221. When the inner finisher 120 and the slide rail 220 are inserted into the in-body space at this position, as illustrated in FIG. 26, in a state in which the inner finisher 120 is mounted, the positioning shaft 123 is engaged with the positioning hole 43, the positioning shaft 123*a* is engaged with the engagement hole 43*a*, and the drawer connector 126 is engaged with the drawer connector 42.

Figure 27:
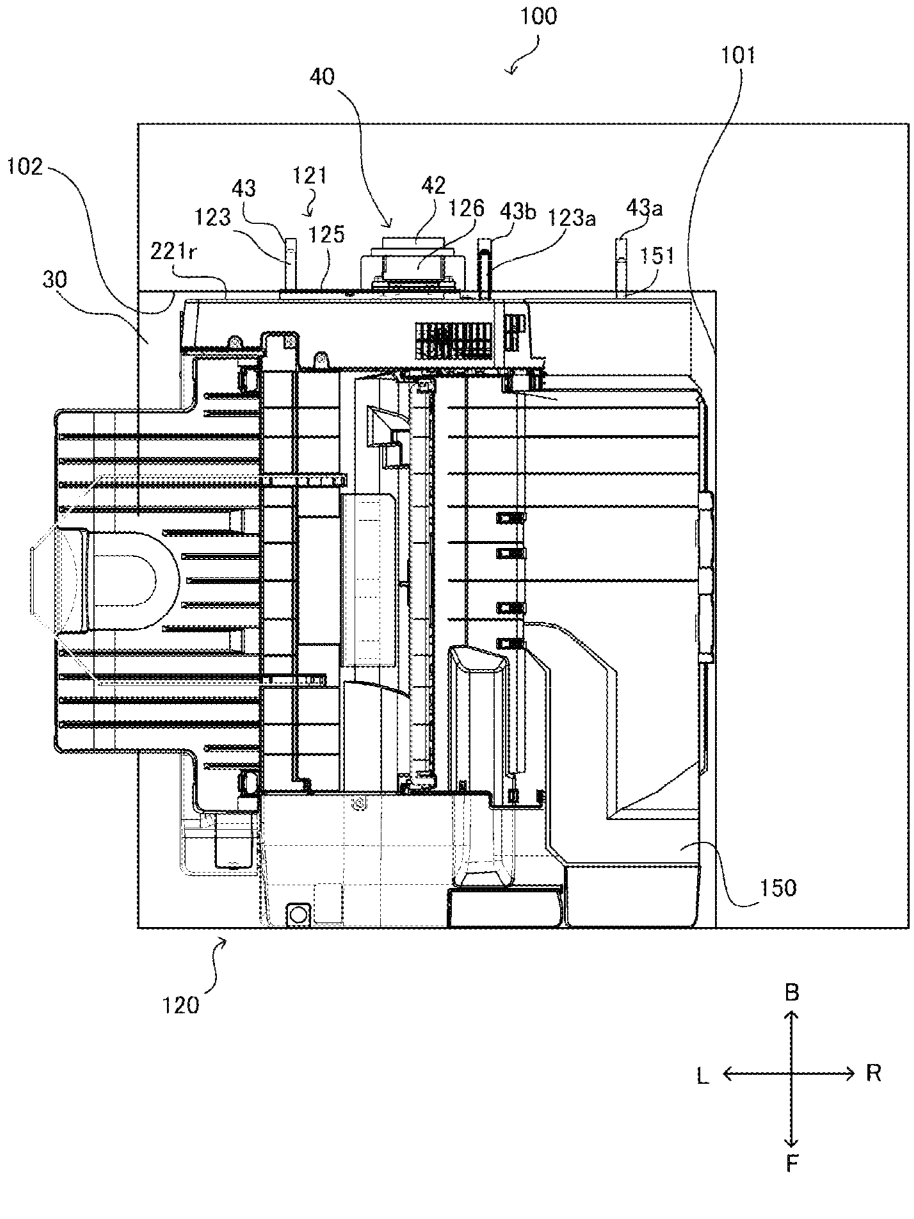
FIG. 27 is a cross-sectional view of the image forming apparatus and the processing unit.
Figure 29:
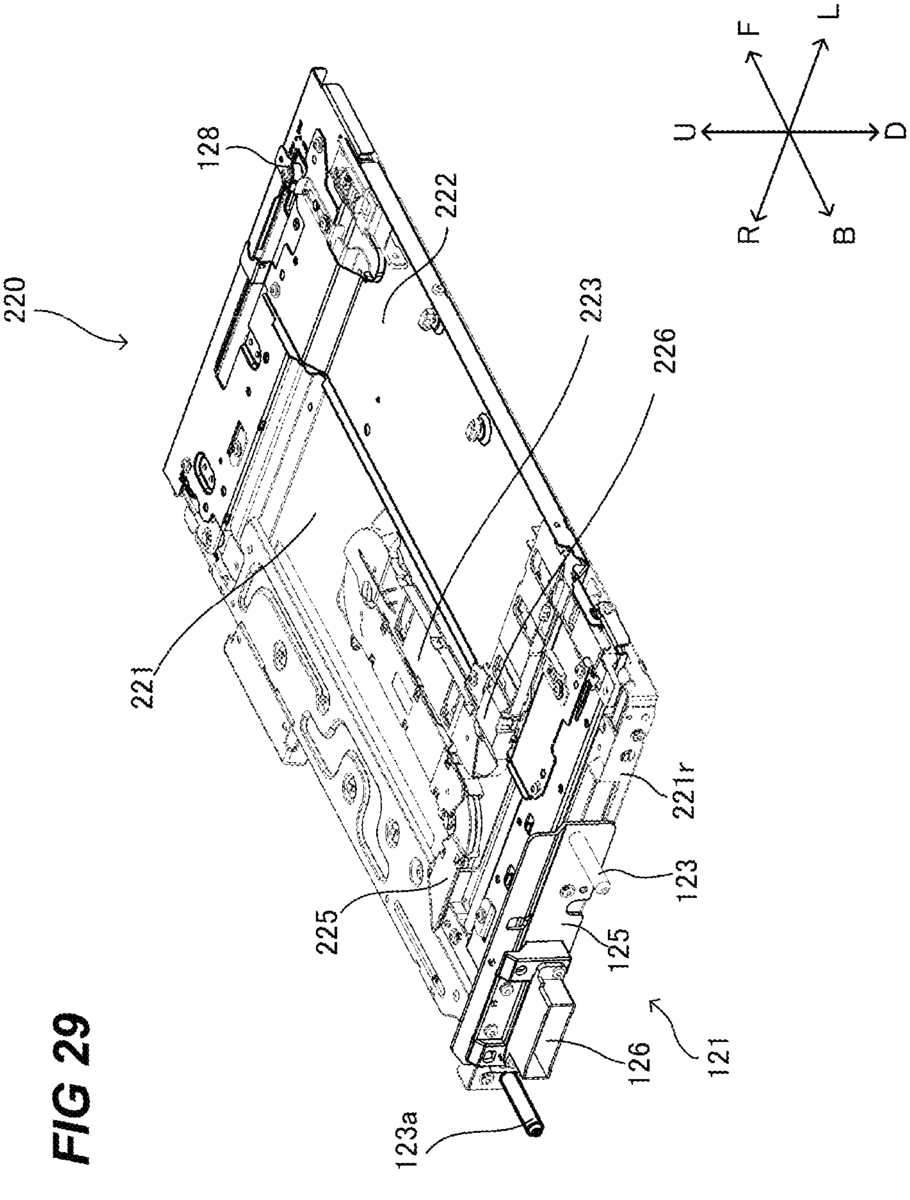
FIG. 29 is a perspective view of the slide rail.

FIG. 29 is a perspective view of the slide rail 220 in a case where the punch unit 150 is attached (that is, a state in FIG. 27) when viewed from the rear side. In this state, the unit connection portion 121 is attached to a second attachment position (the punch unit 150 side with respect to the first attachment position: the arrow R side) on the rear side surface 221*r* of the fixed frame 221. In a case where there is the punch unit 150, when the unit connection portion 121 is attached to the second attachment position, as illustrated in FIG. 27, in a state in which the inner finisher 120 is mounted, the positioning shaft 123 is engaged with the positioning hole 43, the positioning shaft 123*a* is engaged with the positioning hole 43*b*, the positioning shaft 151 of the punch unit 150 is engaged with the positioning hole 43*a*, and the drawer connector 126 is engaged with the drawer connector 42.

Figure 30:
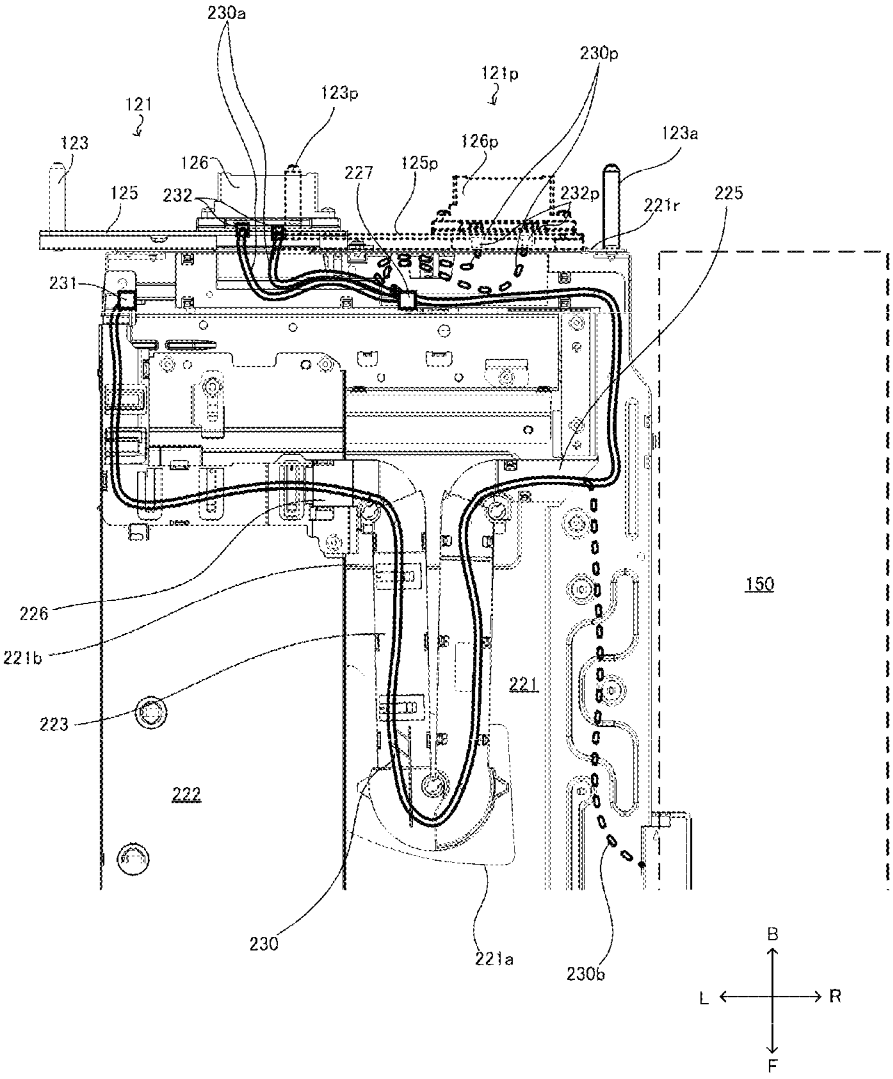
FIG. 30 is a partially enlarged view of an upper surface of the slide rail.

FIG. 30 is a diagram schematically illustrating disposition of the harness cable 230 (hereinafter referred to as a harness 230) in a case where there is the punch unit 150 and a case where there is no punch unit 150. A finisher connection portion (connection terminal) 231 which is one end of the harness 230 is connected to a control board (not illustrated) of the inner finisher 120, and the harness 230 is wound around the inside of a rectangular tube-shaped harness guide 223, passes through a branch portion 227, and is connected to the drawer connector 126 at the connector connection portion 232 at the other end. Although the harness 230 illustrated in FIG. 30 looks like one harness, a plurality of harnesses is actually used. Further, the finisher connection portion 231 may be connected to the control board of the inner finisher 120 at a plurality of locations instead of one.

The unit connection portion 121 indicated by a solid line in FIG. 30 indicates a state of being attached to the above-described first attachment position, and the harness 230*a* indicates a portion between the branch portion 227 and the connector connection portion (connection terminal) 232 connected to the drawer connector 126. On the other hand, a unit connection portion 121*p* (a positioning shaft 123*p*, a unit drawer holding plate 125*p*, and a drawer connector 126*p*) indicated by a dashed line is the same as the unit connection portion 121, but indicates a state in which the unit connection portion is attached to the above-described second attachment position. A harness 230*p* similarly indicated by a dashed line indicates a portion between the branch portion 227 and the connector connection portion (connection terminal) 232*p* connected to the drawer connector 126*p*.

In the present embodiment, the first attachment position, the second attachment position, and the branch portion 227 are disposed at positions where the lengths of the harness 230*a* and the harness 230*p* are substantially the same, and thus a common harness can be used as the harness 230 connected to the drawer connector 126 (126*p*) regardless of the presence or absence of the punch unit 150. In a case where there is the punch unit 150, in order to connect the control board of the inner finisher 120 and the punch unit 150, the harness 230*b* is branched in the front direction (the direction of the arrow F) from the harness 230 routed from the finisher connection portion 231 to the fixed frame connection portion 225, and the harness 230*b* indicated by the dashed line passes between the fixed frame 221 and the bottom surface of the inner finisher 120 and is connected to the control board of the punch unit 150.

As described above, since the unit connection portion 121 can be attached to the fixed frame 221 of the slide rail 220 at the first attachment position and the second attachment position, an attachment position of the unit connection portion 121 can be changed as appropriate depending on the presence or absence of the punch unit 150. As a result, even if the drawer connector 42 on the image forming apparatus 1 side is fixed to the connector disposition surface 102 of the image forming apparatus 1, the drawer connectors (42 and 126) can be connected by simply inserting the inner finisher 120 and the slide rail 220.

In the embodiment described above, an example in which the punch unit 150 is disposed between the pair of discharge rollers 20 and the inner finisher 120 of the image forming apparatus 1 has been described, but the present invention is not limited to the punch unit 150, another processing unit performing a process such as a folding process, a crease process, or a sheet reversing process may be disposed. In addition, two or more processing units may be provided between the pair of discharge rollers 20 and the inner finisher 120, and in this case, it is possible to cope with the increase of the number of processing units by increasing the number of attachment positions of the unit connection portion 121.

Figure 31:
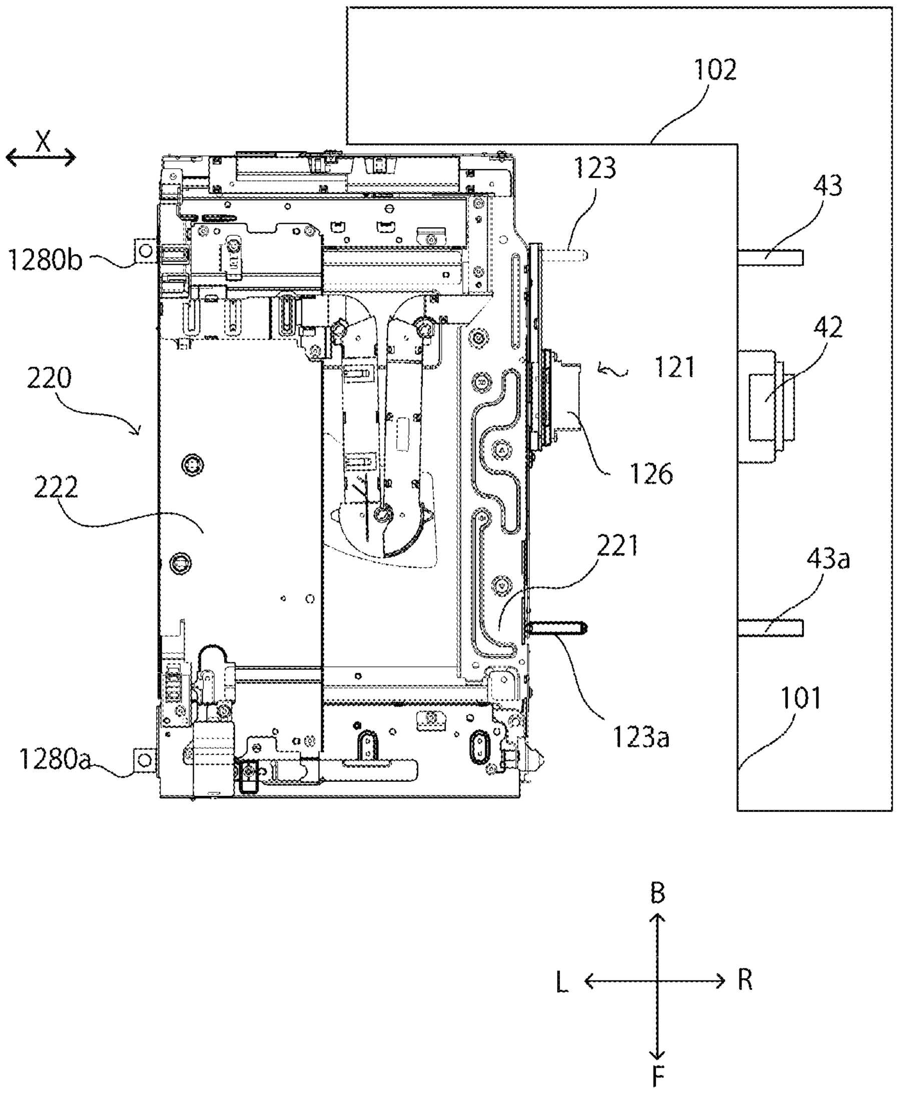
FIG. 31 is an enlarged cross-sectional view of a connector portion of the image forming apparatus and the processing unit.
Figure 32:
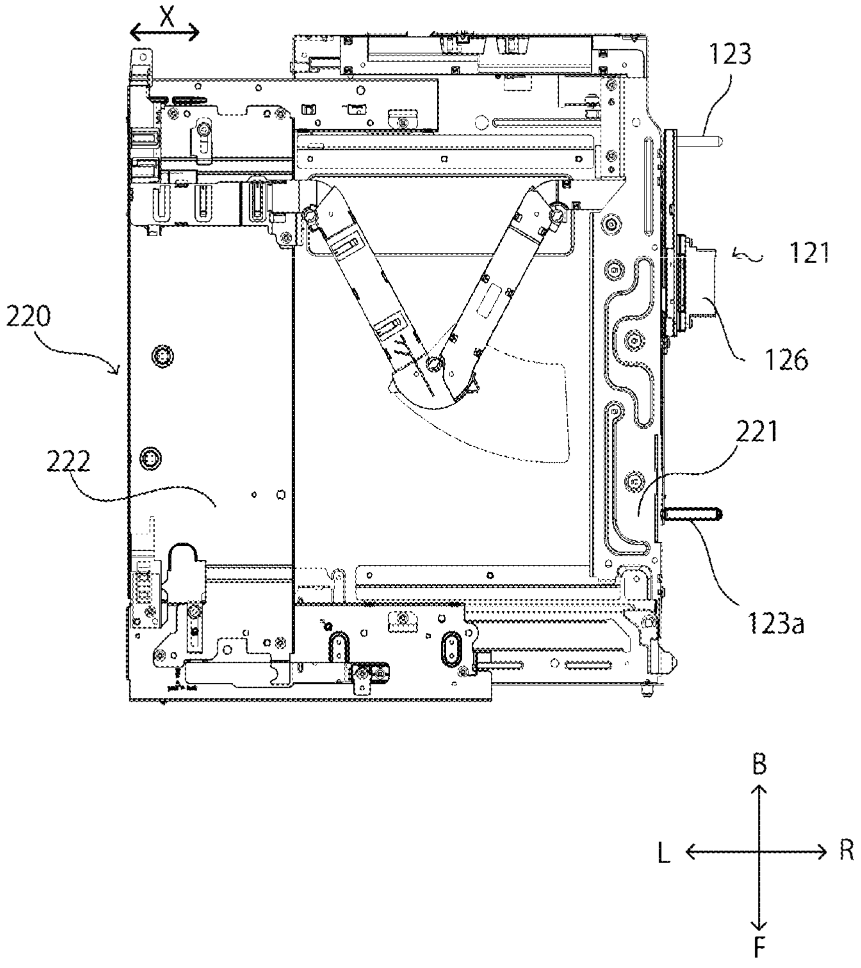
FIG. 32 is a diagram illustrating a modification example of the slide rail.

In the above-described embodiment, the configuration in which the main body side drawer connector 42 is provided on the connector disposition surface 102 (the surface on the apparatus rear side) in the in-body space has been described. However, as illustrated in FIG. 31, the drawer connector 42 may be disposed on the discharge portion disposition surface 101. In this case, the drawer connector 126 may be provided on the discharge portion disposition surface 101 side of the fixed frame 221 of the slide rail 220, and the movable frame 222 may be movable in the direction of the arrow X with respect to the drawer connector 126 (see FIG. 32). In this case, in order to fix the drawer connector 42 and the drawer connector 126 in a fitted state, it is desirable to provide two fixing pins 1280*a* and 1280*b* serving as fixing portions on the left side of the fixed frame 221 in the drawing. The fixing pins 1280*a* and 1280*b* fix the fixed frame 221 to the in-body lower cover 30 in the in-body space of the image forming apparatus to fix the fitting between the drawer connectors.

According to the present invention, the sheet processing apparatus can be separated from the discharge portion of the image forming apparatus in the sheet conveyance direction in a state in which the drawer connectors are connected to each other. Accordingly, even in a state in which the drawer connectors are connected to each other, a jammed sheet between the image forming apparatus and the sheet processing apparatus can be removed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-124669, filed Jul. 31, 2024, No. 2023-177919, filed Oct. 13, 2023, No. 2023-177920, filed Oct. 13, 2023, which is hereby incorporated by reference herein in its entirety.

What is claimed is:

1. An image forming system comprising:

an image forming apparatus configured to form an image on a sheet; and a sheet processing apparatus configured to perform predetermined processing on the sheet received from the image forming apparatus, wherein the image forming apparatus includes an image forming portion configured to form the image on the sheet, a reading portion disposed above the image forming portion and configured to read an original, a discharge portion configured to discharge the sheet on which the image is formed by the image forming portion in a discharge direction toward an in-body space formed between the image forming portion and the reading portion, and a first drawer connector provided on a wall forming the in-body space, and the sheet processing apparatus includes a processing unit configured to perform predetermined processing on the sheet received from the discharge portion, a second drawer connector fitted to the first drawer connector by inserting the processing unit into the in-body space to electrically connect the image forming apparatus and the processing unit, a fixing portion configured to fix the second drawer connector so as not to come off from the first drawer connector in a state in which the first drawer connector and the second drawer connector are fitted to each other, and a separation mechanism configured to separate the processing unit from the discharge portion in the discharge direction in a state in which the first drawer connector and the second drawer connector are fitted by the fixing portion.

2. The image forming system according to claim 1, wherein the sheet processing apparatus includes a fixed frame and a movable frame that is movable with respect to the fixed frame, the second drawer connector is provided in the fixed frame, the fixing portion fixes the fixed frame in the in-body space, and the movable frame moves in the discharge direction while supporting the processing unit.

3. The image forming system according to claim 2, wherein the first drawer connector is provided on a wall on a rear side of the in-body space, and an insertion direction when the second drawer connector is fitted to the first drawer connector is a direction intersecting the discharge direction.

4. The image forming system according to claim 1, wherein the first drawer connector is provided on a wall on a rear side of the in-body space, and an insertion direction when the second drawer connector is fitted to the first drawer connector is a direction intersecting the discharge direction.

* * * * *